US007481101B2

(12) United States Patent
Matsubara et al.

(10) Patent No.: US 7,481,101 B2
(45) Date of Patent: Jan. 27, 2009

(54) EVAPORATED FUEL TREATMENT DEVICE FOR INTERNAL COMBUSTION ENGINE

(75) Inventors: Takuji Matsubara, Yokosuka (JP); Toru Kidokoro, Torrance, CA (US); Yoshihiko Hyodo, Gotemba (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 11/272,733

(22) Filed: Nov. 15, 2005

(65) Prior Publication Data

US 2006/0059979 A1 Mar. 23, 2006

Related U.S. Application Data

(62) Division of application No. 10/700,690, filed on Nov. 5, 2003, now Pat. No. 6,988,396.

(30) Foreign Application Priority Data

Nov. 5, 2002 (JP) ............................ 2002-321659

(51) Int. Cl.
*F02M 25/08* (2006.01)
*G01M 15/00* (2006.01)
*G01M 19/00* (2006.01)

(52) U.S. Cl. .................................................. 73/114.39

(58) Field of Classification Search ................. 73/118.1
See application file for complete search history.

(56) References Cited

U.S. PATENT DOCUMENTS

| | | | | |
|---|---|---|---|---|
| 5,560,346 | A * | 10/1996 | Isobe et al. | 123/519 |
| 5,718,210 | A | 2/1998 | Ito et al. | |
| 5,878,728 | A | 3/1999 | Kidokoro et al. | |
| 5,954,034 | A * | 9/1999 | Takagi | 123/520 |
| 6,098,894 | A * | 8/2000 | Ohta et al. | 237/12.3 C |
| 6,305,361 | B1 | 10/2001 | Takaku et al. | |
| 6,467,463 | B2 * | 10/2002 | Kitamura et al. | 123/516 |
| 6,634,343 | B2 * | 10/2003 | Kano et al. | 123/520 |
| 6,651,491 | B2 * | 11/2003 | Saito et al. | 73/117.3 |
| 6,698,280 | B1 * | 3/2004 | Iden et al. | 73/118.1 |
| 6,761,154 | B2 * | 7/2004 | Takagi et al. | 123/520 |
| 6,804,995 | B2 * | 10/2004 | Kawano | 73/114.39 |
| 6,807,851 | B2 * | 10/2004 | Wakahara et al. | 73/118.1 |
| 6,837,224 | B2 * | 1/2005 | Kidokoro et al. | 123/520 |

(Continued)

FOREIGN PATENT DOCUMENTS

JP 06-026408 2/1994

(Continued)

*Primary Examiner*—Edward Lefkowitz
*Assistant Examiner*—Octavia Davis
(74) *Attorney, Agent, or Firm*—Kenyon & Kenyon LLP

(57) ABSTRACT

A sealing valve 28 that controls a communication state between a fuel tank 10 and a canister 26 is provided. During stop of an internal combustion engine, the sealing valve 28 is generally closed, and the canister 26 is opened to the atmosphere. The sealing valve 28 is opened when the internal combustion engine is stopped, and differential pressure exceeding a valve opening determination value is generated between tank internal pressure and atmospheric pressure. A change in the tank internal pressure generated between before and after the sealing valve 28 is opened is detected. When the change in the tank internal pressure is below a predetermined determination value, closing failure of the sealing valve is determined.

3 Claims, 13 Drawing Sheets

U.S. PATENT DOCUMENTS 6,966,218 B2 * 11/2005 Oki et al. .................. 73/118.1
6,988,396 B2 * 1/2006 Matsubara et al. ......... 73/118.1

FOREIGN PATENT DOCUMENTS

JP 2000-345927 12/2000
JP 2001-193580 7/2001
JP 2001-342914 12/2001

* cited by examiner

EVAPORATED FUEL TREATMENT DEVICE FOR INTERNAL COMBUSTION ENGINE

This is a division of application Ser. No. 10/700,690 filed 5 Nov. 2003 now U.S. Pat. No. 6,988,396, which claims priority to Japanese Patent Application No. 2002-321659 filed 5 Nov. 2002, the contents of which are incorporated herein by reference.

BACKGROUND OF THE INVENTION

1. Field of the Invention

The present invention relates to an evaporated fuel treatment device, and more particularly to an evaporated fuel treatment device for treating evaporated fuel generated in a fuel tank without being released into the atmosphere.

2. Background Art

As disclosed in, for example, Japanese Patent Laid-Open No. 2001-193580, an evaporated fuel treatment device is known that includes a canister for adsorbing evaporated fuel generated in a fuel tank. In this device, the fuel tank communicates with the canister via a charge control valve and communicates with an intake passage of an internal combustion engine via a tank pressure control valve.

In the conventional device, the tank pressure control valve is opened to introduce induction negative pressure into the fuel tank, thus keeping tank internal pressure in a negative state, during operation of the internal combustion engine. Keeping the tank internal pressure in the negative state as described above prevents the evaporated fuel generated in the fuel tank from being released into the atmosphere.

In the conventional device, if abnormality occurs in the charge control valve placed between the fuel tank and the canister, proper treatment of the evaporated fuel generated in the fuel tank becomes difficult. Thus, this device requires diagnosing whether the charge control valve normally functions.

To meet this requirement, the conventional device diagnoses the charge control valve by the below described method. Specifically, when diagnosing the charge control valve, the device first closes both the charge control valve and the tank pressure control valve and forms a state where the canister is opened to the atmosphere under a situation where the tank internal pressure is made negative by normal control. Then, the device issues a valve opening instruction to the charge control valve, and determines whether a change occurs in the tank internal pressure between before and after the instruction.

If the charge control valve is properly opened in the state where the tank internal pressure is negative, air flows from the canister into the fuel tank to increase the tank internal pressure. On the other hand, if the charge control valve remains closed, that is, if closing failure occurs in the charge control valve, no change occurs in the tank internal pressure between before and after the valve opening instruction. Thus, if there in no sign of significant increase in the tank internal pressure between before and after the instruction, the conventional device determines that the closing failure occurs in the charge control valve. According to the above described procedure, the conventional device can accurately detect the closing failure of the charge control valve.

SUMMARY OF THE INVENTION

However, the diagnosing procedure of the closing failure cannot be used in a device in which the tank internal pressure is not negative in normal control.

Therefore, the invention has an object to provide an evaporated fuel treatment device of an internal combustion engine that can efficiently detect closing failure of a sealing valve (corresponding to the above described charge control valve) for tightly sealing a fuel tank without tank internal pressure being negative in normal control.

The above object of the present invention is achieved by an evaporated fuel treatment device of an internal combustion engine having a canister that adsorbs evaporated fuel generated in a fuel tank for treatment. The device includes a sealing valve that controls a communication state between the fuel tank and the canister. A stopping time control unit is provided for generally closing the sealing valve, and opening the canister to the atmosphere during stop of the internal combustion engine. A stopping time sealing valve opening unit is also provided for issuing a valve opening instruction to the sealing valve when the internal combustion engine is stopped and differential pressure exceeding a valve opening determination value is generated between tank internal pressure and atmospheric pressure. The device also includes a tank internal pressure change detection unit that detects a change in the tank internal pressure occurring between before and after the sealing valve opens. The device further includes a closing failure determination unit that determines closing failure of the sealing valve, when the change in the tank internal pressure is below a predetermined determination value.

The above object of the present invention is achieved by an evaporated fuel treatment device of an internal combustion engine having a canister that adsorbs evaporated fuel generated in a fuel tank for treatment. The device includes a sealing valve that controls a communication state between the fuel tank and the canister. A negative pressure introduction unit is provided for introducing negative pressure into the canister, with the sealing valve being closed. A negative pressure time sealing valve opening unit is also provided for issuing a valve opening instruction to the sealing valve when canister side pressure is negative exceeding a negative pressure determination value. A pressure change detection unit is further provided for detecting a change occurring in tank internal pressure or the canister side pressure between before and after the valve opening instruction to the sealing valve. The device also includes an opening failure determination unit that determines whether the sealing valve opens under a condition where the sealing valve should be closed. The device further includes a closing failure determination unit that determines closing failure of the sealing valve, when there is no sign that the sealing valve opens in the state where the sealing valve should be closed, and the change occurring in the tank internal pressure or the canister side pressure between before and after the valve opening instruction to the sealing valve is below a predetermined determination value.

The above object of the present invention is achieved by an evaporated fuel treatment device of an internal combustion engine having a canister that adsorbs evaporated fuel generated in a fuel tank for treatment. The device includes a sealing valve that controls a communication state between the fuel tank and the canister. A negative pressure introduction unit is provided for introducing negative pressure into the canister, with the sealing valve being closed. A negative pressure time sealing valve opening unit is provided for issuing a valve opening instruction to the sealing valve when canister side pressure is negative exceeding a negative pressure determination value. The device also includes a pressure change detection unit that detects a change occurring in tank internal pressure or the canister side pressure between before and after the valve opening instruction to the sealing valve. The device further includes a closing failure normality determination unit that determines that no closing failure occurs in the sealing valve, when the change occurring in the tank internal pressure or the canister side pressure between before and after the valve opening instruction to the sealing valve exceeds a predetermined determination value.

The above object of the present invention is achieved by an evaporated fuel treatment device of an internal combustion engine having a canister that adsorbs evaporated fuel generated in a fuel tank for treatment. The device includes a sealing valve that controls a communication state between the fuel tank and the canister. A negative pressure introduction unit is provided for introducing negative pressure into the canister, with the sealing valve being closed. A negative pressure time sealing valve opening unit is provided for issuing a valve opening instruction to the sealing valve when canister side pressure is negative exceeding a negative pressure determination value. A pressure change detection unit is provided for detecting a change occurring in tank internal pressure or the canister side pressure between before and after the valve opening instruction to the sealing valve. The device also includes a sealing valve opening determination unit that determines whether the sealing valve actually opens. The device further includes a closing failure determination unit that determines closing failure of the sealing valve, when the change occurring in the tank internal pressure or the canister side pressure between before and after the valve opening instruction to the sealing valve is below a predetermined determination value, and there is no sign that the sealing valve actually opens.

The above object of the present invention is achieved by an evaporated fuel treatment device of an internal combustion engine having a canister that adsorbs evaporated fuel generated in a fuel tank for treatment. The device includes a sealing valve that controls a communication state between the fuel tank and the canister. A tank internal pressure control unit is provided for issuing a valve opening instruction to the sealing valve when tank internal pressure reaches predetermined valve opening pressure. The device also includes a decompression presence/absence determination unit that determined whether the tank internal pressure is reduced in response to the valve opening instruction by the tank internal pressure control means. The device further includes a closing failure determination unit that determines closing failure of the sealing valve when there is no sign of the reduction in the tank internal pressure.

The above object of the present invention is achieved by an evaporated fuel treatment device of an internal combustion engine having a canister that adsorbs evaporated fuel generated in a fuel tank for treatment. The device includes a sealing valve that controls a communication state between the fuel tank and the canister. The device also includes a tank internal pressure control unit that issues a valve opening instruction to the sealing valve when tank internal pressure reaches predetermined valve opening pressure. The device further includes a closing failure determination unit that determines closing failure of the sealing valve when tank internal pressure exceeds a predetermined determination value which is higher than the valve opening pressure in a state where the tank internal pressure control means is allowed to operate.

Other objects and further features of the present invention will be apparent from the following detailed description when read in conjunction with the accompanying drawings.

BEST MODE FOR CARRYING OUT THE INVENTION

Figure 1A:
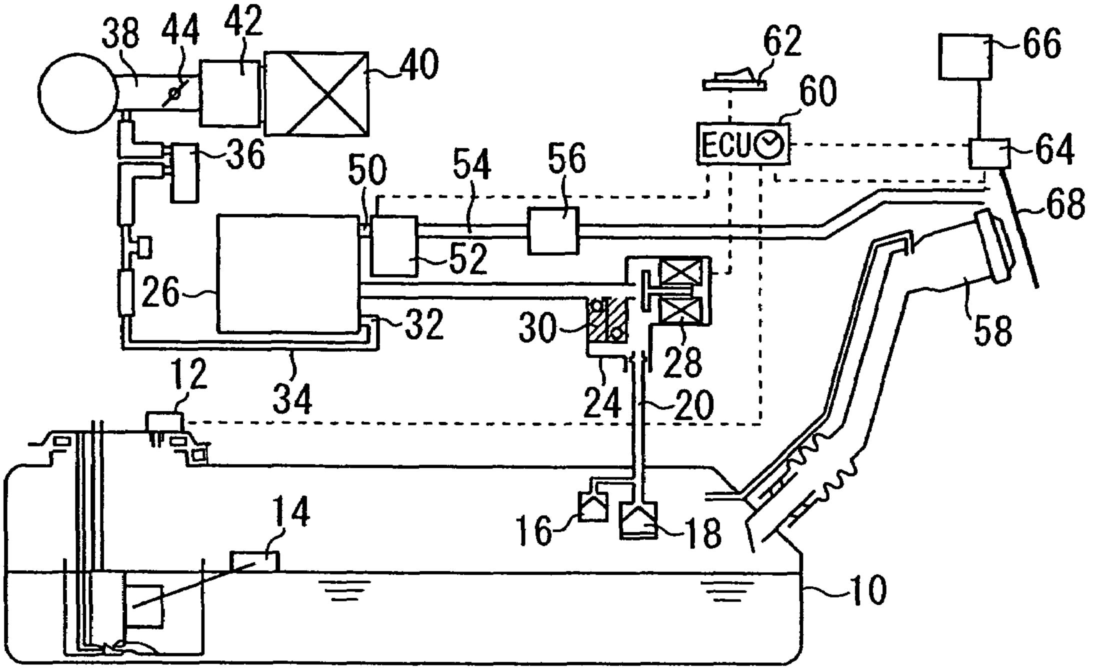
FIG. 1A is an illustration for describing a structure of a device according to a first embodiment of the invention.

Now, embodiments of the invention will be described with reference to the drawings. Like reference numerals denote like components throughout the drawings, and redundant descriptions will be omitted.

First Embodiment

[Description of Structure of Device]

FIG. 1A illustrates a structure of an evaporated fuel treatment device according to a first embodiment of the invention. As shown in FIG. 1A, the device according to the present embodiment includes a fuel tank 10. The fuel tank 10 has a tank internal pressure sensor 12 for measuring tank internal pressure Ptnk. The tank internal pressure sensor 12 detects the tank internal pressure Ptnk as relative pressure with respect to atmospheric pressure, and generates output in response to a detection value. A liquid level sensor 14 for detecting a liquid level of fuel is placed in the fuel tank 10.

A vapor passage 20 is connected to the fuel tank 10 via ROVs (Roll Over Valves) 16, 18. The vapor passage 20 has a sealing valve unit 24 on the way thereof, and communicates with a canister 26 at an end thereof. The sealing valve unit 24 has a sealing valve 28 and a pressure control valve 30. The sealing valve 28 is a solenoid valve of a normally closed type, which is closed in a nonenergized state, and opened by a driving signal being supplied from outside. The pressure control valve 30 is a mechanical two-way check valve constituted by a forward relief valve that is opened when pressure of the fuel tank 10 side is sufficiently higher than pressure of the canister 26 side, and a backward relief valve that is opened when the pressure of the canister 26 side is sufficiently higher than the pressure of the fuel tank 10 side. Valve opening pressure of the pressure control valve 30 is set to, for example, about 20 kPa in a forward direction, and about 15 kPa in a backward direction.

The canister 26 has a purge hole 32. A purge passage 34 communicates with the purge hole 32. The purge passage 34 has a purge VSV (Vacuum Switching Valve) 36, and communicates, at an end thereof, with an intake passage 38 of the internal combustion engine. An air filter 40, an airflow meter 42, a throttle valve 44, or the like are provide in the intake passage 38 of the internal combustion engine. The purge passage 34 communicates with the intake passage 38 downstream of the throttle valve 44.

The canister 26 is filled with activated carbon. The evaporated fuel having flown into the canister 26 through the vapor passage 20 is adsorbed by the activated carbon. The canister 26 has an atmosphere hole 50. An atmosphere passage 54 communicates with the atmosphere hole 50 via a negative pressure pump module 52. The atmosphere passage 54 has an air filter 56 on the way thereof. An end of the atmosphere passage 54 is opened to the atmosphere near a refueling port 58 of the fuel tank 10.

As shown in FIG. 1A, the evaporated fuel treatment device according to the present embodiment has an ECU 60. The ECU 60 includes a soak timer for counting an elapsed time during parking of a vehicle. A lid switch 62 and a lid opener opening/closing switch 64 are connected to the ECU 60 together with the tank internal pressure sensor 12, the sealing valve 28, and the negative pressure pump module 52. A lid manual opening/closing device 66 is connected to the lid opener opening/closing switch 64 using a wire.

The lid opener opening/closing switch 64 is a lock mechanism of a lid (lid of a body) 68 that covers the refueling port 58, and unlocks the lid 68 when a lid opening signal is supplied from the ECU 60, or when a predetermined opening operation is performed on the lid manual opening/closing device 66. The lid switch 62 connected to the ECU 60 is a switch for issuing an instruction to unlock the lid 68 to the ECU 60.

Figure 1B:
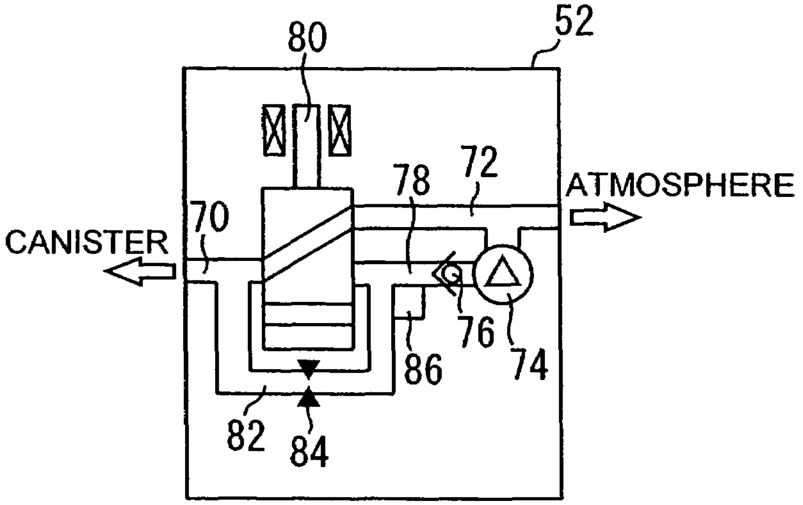
FIG. 1B is an enlarged view for illustrating details of the negative pressure pump module shown in FIG. 1A.

FIG. 1B is an enlarged view for illustrating details of the negative pressure pump module 52 shown in FIG. 1A. The negative pressure pump module 52 has a canister side passage 70 communicating with the atmosphere hole 50 of the canister 26, and an atmosphere side passage 72 communicating with the atmosphere. The atmosphere side passage 72 communicates with a pump passage 78 having a pump 74 and a check valve 76.

The negative pressure pump module 52 has a switching valve 80 and a bypass passage 82. The switching valve 80 makes communication between the canister side passage 70 and the atmosphere side passage 72 in the nonenergized state (OFF state), and makes communication between the canister side passage 70 and the pump passage 78 in a state where the driving signal is supplied from outside (ON state). The bypass passage 82, which has a reference orifice 84 with a 0.5 mm diameter on the way thereof, makes communication between the canister side passage 70 and the pump passage 78.

Further, a pump module pressure sensor 86 is incorporated into the negative pressure pump module 52. The pump module pressure sensor 86 can detect pressure in the pump passage 78 at a position between the switching valve 80 and the check valve 76.

[Description of Basic Operations]

Next, basic operations of the evaporated fuel treatment device according to the present embodiment will be described.

During Parking

The evaporated fuel treatment device according to the present embodiment generally keeps the sealing valve 28 in a closed state during the parking of the vehicle. When the sealing valve 28 is closed, the fuel tank 10 is separated from the canister 26 as long as the pressure control valve 30 is closed. Thus, in the evaporated fuel treatment device according to the present embodiment, the canister 26 adsorbs no more evaporated fuel during the parking of the vehicle, as long as the tank internal pressure Ptnk is lower than the forward direction valve opening pressure (20 kPa) of the pressure control valve 30. Similarly, the fuel tank 10 sucks no air during the parking of the vehicle, as long as the tank internal pressure Ptnk is higher than backward direction valve opening pressure (−15 kPa).

During Refueling

In the device according to the present embodiment, when the lid switch 62 is operated during the parking of the vehicle, the ECU 60 is first activated to open the sealing valve 28. At this time, if the tank internal pressure Ptnk is higher than the atmospheric pressure, the evaporated fuel in the fuel tank 10 flows into the canister 26 at the same time as the sealing valve 28 is opened, and is adsorbed by the activated carbon therein. Thus, the tank internal pressure Ptnk is reduced near the atmospheric pressure.

When the tank internal pressure Ptnk is reduced near the atmospheric pressure, the ECU 60 issues an instruction to unlock the lid 68 to the lid opener 64. Receiving the instruction, the lid opener 64 unlocks the lid 68. This allows an opening operation of the lid 68 after the tank internal pressure Ptnk reaches near the atmospheric pressure, in the device according to the present embodiment.

After allowance of the opening operation of the lid 68, the lid 68 is opened, a tank cap is opened, and then refueling is started. The tank internal pressure Ptnk is reduced near the atmospheric pressure before the tank cap is opened, thus the opening operation does not cause the evaporated fuel to be released from the refueling port 58 into the atmosphere.

The ECU 60 keeps the sealing valve 28 in an opened state until the refueling is finished (concretely, until the lid 68 is closed). Thus, a gas in the tank can flow into the canister 26 through the vapor passage 20 during the refueling, thereby ensuring good refueling properties. At this time, the flowing evaporated fuel is not released into the atmosphere because being adsorbed by the canister 26.

During Running

During running of the vehicle, control to purge the evaporated fuel adsorbed by the canister 26 is performed when a predetermined purge condition is satisfied. Concretely, in this control, the purge VSV 36 is appropriately subjected to duty driving, with the switching valve 80 being in the nonenergized state (normal state) and with the atmosphere hole 50 of the canister 26 being opened to the atmosphere. When the purge VSV 36 is subjected to the duty driving, induction negative pressure of the internal combustion engine is introduced into the purge hole 32 of the canister 26. Thus, the evaporated fuel in the canister 26 is purged into the intake passage 38 of the internal combustion engine, together with air sucked from the atmosphere hole 50.

During the running of the vehicle, the sealing valve 28 is appropriately opened so that the tank internal pressure Ptnk is kept near the atmospheric pressure, in order to reduce decompression time before the refueling. It should be noted that the opening of the valve is performed only during the purging of the evaporated fuel, that is, while the induction negative pressure is introduced into the purge hole 32 of the canister 26. In a state where the induction negative pressure is introduced into the purge hole 32, the evaporated fuel flowing out of the fuel tank 10 and into the canister 26 flows through the purge hole 32 without entering deeply inside the canister 26, and is then sucked into the intake passage 38. Thus, according to the device of the present embodiment, the canister 26 does not further adsorb a large amount of evaporated fuel during the running of the vehicle.

As described above, according to the evaporated fuel treatment device of the present embodiment, it is generally possible to limit the evaporated fuel adsorbed by the canister 26 only to the evaporated fuel flowing out of the fuel tank 10 during the refueling. Thus, the device according to the present embodiment allows reduction in size of the canister 26, and achieves satisfactory exhaust emission properties and good refueling properties.

[Description on Abnormality Detection Operation]

Figure 2:
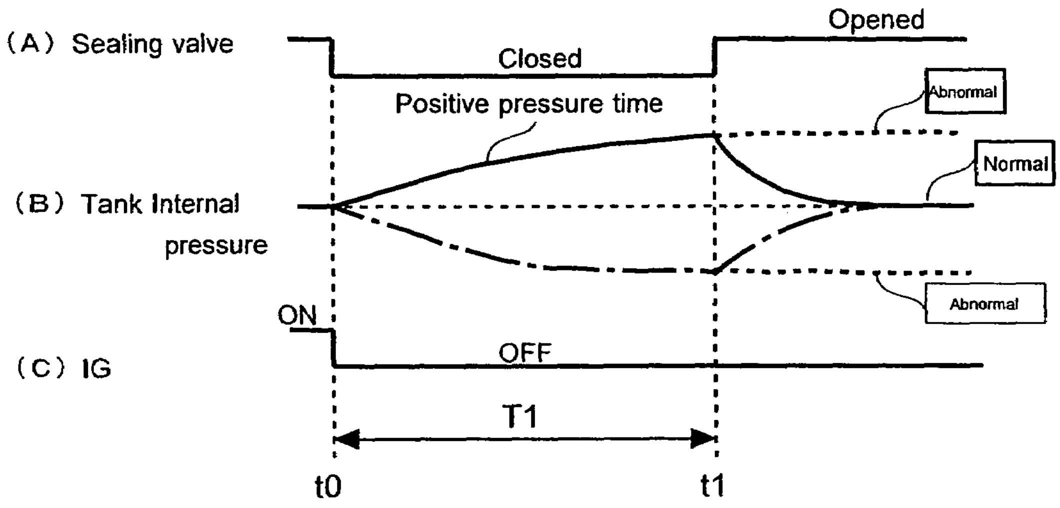
FIGS. 2A through 2C are timing charts for describing an operation of the device according to the first embodiment of the invention.

In the evaporated fuel treatment device, there is required a function of rapidly detecting abnormality leading to worse emission properties such as leakage in a system or abnormality of the sealing valve 28. Now, abnormality detection that is performed by the device of the present embodiment for detecting closing failure of the sealing valve 28 will be described with reference to FIGS. 2 and 3.

FIGS. 2A through 2C are timing charts for illustrating the abnormality detection that is performed by the device of the present embodiment for detecting the closing failure of the sealing valve 28. More specifically, FIG. 2A shows a state of the sealing valve 28, FIG. 2B shows a change in the tank internal pressure Ptnk (output of the tank internal pressure sensor 12), and FIG. 2C shows a state of an ignition switch (IG switch) of the vehicle. In the present embodiment, the abnormality detection is performed during the parking of the vehicle from the viewpoint of minimizing influence of various disturbances.

As described above, the sealing valve 28 is generally closed during the parking of the vehicle, that is, during stop of the internal combustion engine. Thus, as shown in FIG. 2A, when the IG switch is turned off at time t0, the sealing valve 28 is simultaneously closed.

The ECU 60 includes the soak timer as described above. When a predetermined time period T1 is counted by the soak timer, the ECU 60 is activated to start the abnormality detection (time t1).

While the predetermined time period T1 elapses, the sealing valve 28 is closed to tightlyseal the fuel tank 10. After the internal combustion engine is stopped, the evaporated fuel is sometimes continuously generated by residual heat in the fuel tank 10. In such a case, the tank internal pressure Ptnk becomes positive after the time t0 as indicated by a solid line in FIG. 2B. After the internal combustion engine is stopped, the evaporated fuel is sometimes liquefied in the fuel tank 10 as the temperature decreases. In such a case, the tank internal pressure Ptnk becomes negative after the time t0 as indicated by a single dot dashed line in FIG. 2B.

In the present embodiment, when activated for the abnormality detection at the time t1, the ECU 60 changes the sealing valve 28 from the closed state to the opened state. During the parking of the vehicle, the switching valve 80 is in the nonenergized state (normal state), and the canister 26 is opened to the atmosphere. Thus, when the sealing valve 28 opens in that state, the fuel tank 10 opens to the atmosphere, and then the tank internal pressure Ptnk changes toward the atmospheric pressure.

On the other hand, when the sealing valve 28 does not opens normally although the ECU 60 has issued the valve opening instruction to the sealing valve 28, that is, when the sealing valve 28 cannot open because of the closing failure, the tank internal pressure Ptnk is continuously kept positive or negative after the time t1, as indicated by a dashed line in FIG. 2B. Thus, the ECU 60 checks whether a normal change occurs in the tank internal pressure Ptnk after the time t1, and thereby accurately determines whether the closing failure occurs in the sealing valve 28.

[Contents of Procedures Performed by ECU]

Figure 3:
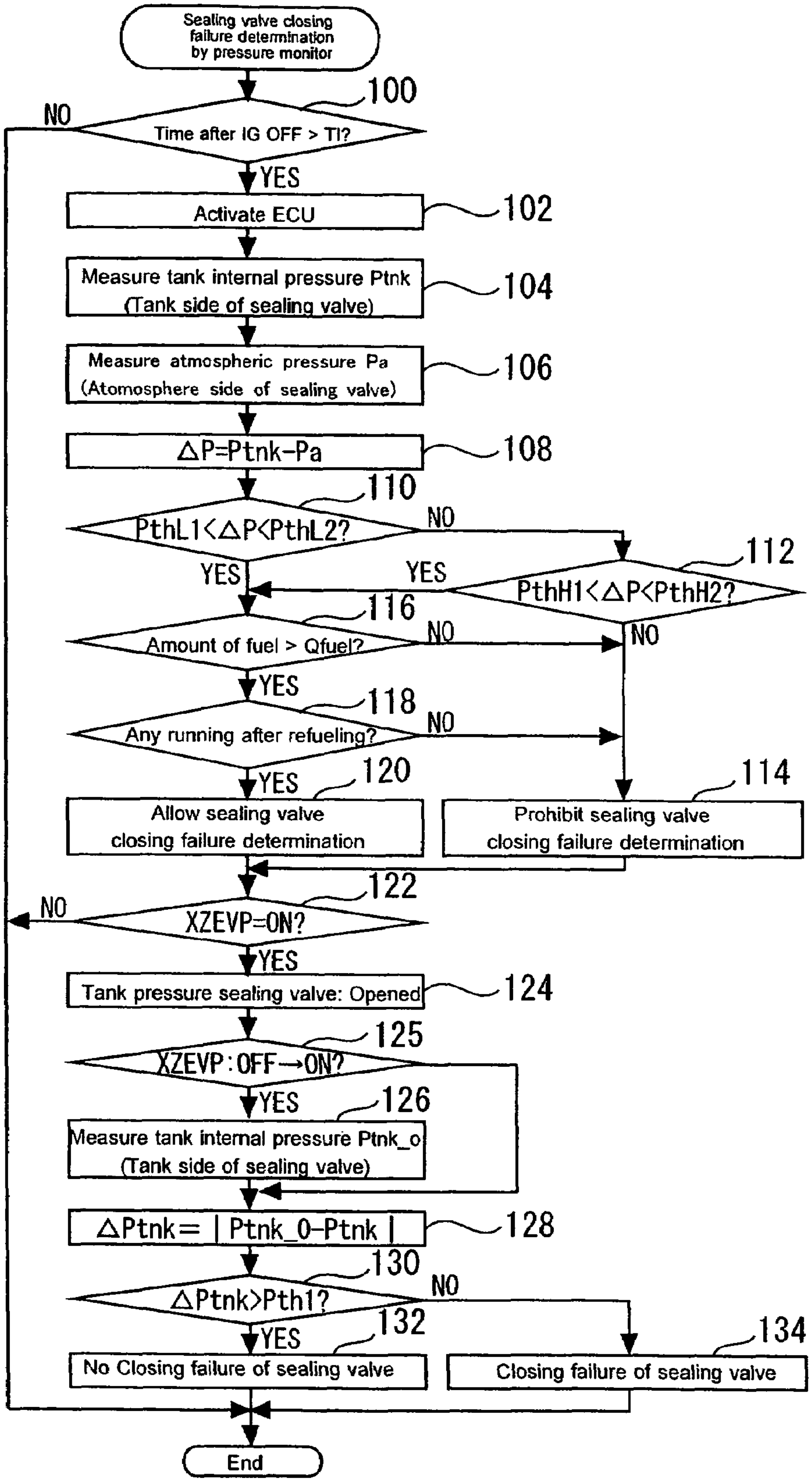
FIG. 3 is a flowchart of a control routine performed in the first embodiment of the invention.

FIG. 3 is a flowchart of a control routine performed by the ECU 60 for detecting the closing failure of the sealing valve 28 according to the above described principle. It should be noted that the ECU 60 starts counting of the soak timer at the time when the vehicle enters the parking state as a precondition for performing this routine.

In the routine shown in FIG. 3, it is determined whether an elapsed time period since the IG switch is turned off exceeds the predetermined time period T1, based on a count value of the soak timer (Step 100).

The predetermined time period T1 is a predetermined value as a time required for the tank internal pressure Ptnk to be sufficiently apart from atmospheric pressure Pa by vaporization of the fuel by the residual heat, or liquefaction of the evaporated fuel by cooling, after the IG switch is turned off.

If it is determined in Step 100 that the elapsed time period since the IG switch is turned off does not exceed the predetermined time period T1, the current procedure cycle is finished. On the other hand, if it is determined that the elapsed time period since the IG switch is turned off exceeds the predetermined time period T1, the ECU 60 which is in a standby state for quickly starting the abnormality detection is fully activated (Step 102).

Then, the tank internal pressure Ptnk and the atmospheric pressure Pa at that time are successively measured (Steps 104, 106).

At the time when Step 104 is performed, the switching valve 80 is in the nonenergized state. In this case, the pump module pressure sensor 86 is exposed to the atmospheric pressure. Thus, the pump module pressure sensor 86 can detect the atmospheric pressure Pa.

Next, a difference between the tank internal pressure Ptnk and the atmospheric pressure Pa, $\Delta P = Ptnk - Pa$, is calculated (Step 108).

Then, it is determined whether the differential pressure ΔP is between a negative pressure side lower limit determination value PthL1 and a negative pressure side upper limit determination value PthL2 (Step 110).

When it is determined that a condition of $PthL1 < \Delta P < PthL2$ is not satisfied, it is then determined whether the differential pressure ΔP is between a positive pressure side lower limit determination value PthH1 and a positive pressure side upper limit determination value PthH2 (Step 112).

As described above, the device of the present embodiment issues the valve opening instruction to the sealing valve 28 in the state where the tank internal pressure Ptnk is apart from the atmospheric pressure, and determines whether the closing failure occurs in the sealing valve depending on whether a significant change occurs in the tank internal pressure Ptnk. If there is no significant difference between the tank internal pressure Ptnk and the atmospheric pressure Pa before the valve opening instruction is issued to the sealing valve 28, no significant change occurs in the tank internal pressure Ptnk even if the sealing valve 28 opens normally. Thus, for detecting the closing failure of the sealing valve 28 by the above described method, there must be a sufficient difference ΔP between the tank internal pressure Ptnk and the atmospheric pressure Pa at the time when the valve opening instruction is issued to the sealing valve 28.

The negative pressure side upper limit determination value PthL2 (<0) used in Step 110 is predetermined as a limit value of the negative pressure that can cause the significant change in the tank internal pressure Ptnk as the sealing valve 28 is opened. The positive pressure side lower limit determination value PthH1 (>0) used in Step 112 is predetermined as a limit value of the positive pressure that can cause the significant change in the tank internal pressure Ptnk as the sealing valve 28 is opened. Thus, when either the condition of Step 110 or the condition of Step 112 is satisfied, it can be determined that one condition required for determining the closing failure of the sealing valve 28 is satisfied. On the other hand, neither of the condition of ΔP<PthL2 nor the condition PthH1<ΔP is not satisfied, it can be determined that the precondition required for determining the closing failure of the sealing valve 28 is not satisfied.

In the device according to the present embodiment, when the sealing valve 28 is opened in the state where the tank internal pressure Ptnk is sufficiently negative, a large amount of air flows into the fuel tank 10 through the canister 26 and the sealing valve 28. After the abnormality detection is finished, the sealing valve 28 is again closed to tightly seal the fuel tank 10. Thereafter, during a process where the fuel tank 10 is kept in the tightly sealed state, a larger amount of air flowing into the fuel tank 10 during the abnormality detection tends to cause higher tank internal pressure Ptnk, and is more apt to open the pressure control valve 30 to unseal the fuel tank 10. Thus, it is desirable that the amount of air allowed to flow into the fuel tank 10 during the abnormality detection is small.

The negative pressure side lower limit determination value PthL1 (<0) used in Step 110 is pressure at which the amount of air flowing into the fuel tank 10 as the sealing valve 28 is opened reaches a tolerance limit. That is, the negative pressure side lower limit determination value PthL1 is limit pressure that has no possibility to increase the tank internal pressure Ptnk to an inappropriate high value during the process where the fuel tank 10 is kept in the tightly sealed state after the abnormality detection as long as the condition of PthL1<ΔP is satisfied. Thus, when the condition of Step 110 is satisfied, it can be determined that closing failure determination of the sealing valve 28 does not excessively increase the tank internal pressure Ptnk thereafter. On the other hand, when the condition of PthL1<ΔP is not satisfied, it can be determined that the closing failure determination of the sealing valve 28 should not be performed since the abnormality detection has a possibility to increase the tank internal pressure Ptnk to an inappropriate high value thereafter.

In the device according to the present embodiment, when the sealing valve 28 opens in a state where the tank internal pressure Ptnk is sufficiently positive, a large number of evaporated fuel flows out of the fuel tank 10 toward the canister 26, and the evaporated fuel may blow through the canister 26 to the atmosphere. The positive pressure side upper limit determination value PthH2 (>0) used in Step 112 is a value set as a limit value that prevents the evaporated fuel from blowing through the canister 26 when the sealing valve 28 opens. Thus, when the condition of Step 112 is satisfied, it can be determined that there is no possibility of blow through of the evaporated fuel during the process of the closing failure determination of the sealing valve 28. On the other hand, when the condition of ΔP<PthH2 is not satisfied, it can be determined that the closing failure determination of the sealing valve 28 should not be performed since there is a possibility that the evaporated fuel blows through the canister 26 during the process of the failure determination.

In the routine shown in FIG. 3, when it is determined that neither the condition of PthL1<ΔP<PthL2 nor the condition of PthH1<ΔP<PthH2 is not satisfied in Steps 110 and 112, a determination execution flag XZEVP is turned OFF (Step 114).

When the determination execution flag XZEVP is turned OFF, an execution of the closing failure determination of the sealing valve 28 is prohibited as described later. Thus, according to the routine shown in FIG. 3, it is possible to prohibit the execution of the closing failure determination of the sealing valve 28 in the state where the normal opening of the sealing valve 28 causes no significant change in the tank internal pressure Ptnk, in the state where the tank internal pressure Ptnk would excessively increase if the closing failure determination is executed, and in the state where the closing failure determination causes the blow through of the evaporated fuel.

If it is determined that the condition of Step 110 is satisfied, or that the condition of Step 112 is satisfied, it is then determined whether the amount of fuel stored in the fuel tank 10 is larger than a predetermined determination value Qfuel, based on output of the liquid level sensor 14 (Step 116).

A larger amount of air is sucked into the fuel tank 10 as the sealing valve 28 is opened (when Ptnk is negative), when the fuel tank 10 has a larger capacity, that is, contains a smaller amount of fuel. A larger amount of evaporated fuel flows out of the fuel tank 10 as the sealing valve 28 is opened (when Ptnk is positive), when the fuel tank 10 contains a smaller amount of fuel. Thus, if it is determined in Step 116 that the amount of fuel in the fuel tank 10 is not larger than the determination value Qfuel, the procedure of Step 114 is performed to prohibit the execution of the closing failure determination of the sealing valve 28. On the other hand, if it is determined that the condition of the amount of fuel>Qfuel is satisfied, it is then determined whether there is a running history of the vehicle after last refueling (Step 118).

As described above, the device according to the present embodiment causes the evaporated fuel to flow out of the fuel tank 10 during refueling, and causes the evaporated fuel to be adsorbed by the canister 26. Thus, immediately after the refueling, a large amount of evaporated fuel is adsorbed in the canister 26. When the closing failure determination of the sealing valve 28 is performed in such a state, the evaporated fuel tends to blow through the canister 26 to the atmosphere as the sealing valve 28 opens. Thus, if it is determined in Step 118 that there is no running history after the refueling, the procedure of Step 114 is performed to prohibit the execution of the closing failure determination of the sealing valve 28.

The evaporated fuel adsorbed by the canister 26 is reduced by being purged into the intake passage 38 during the running of the vehicle. Thus, if the vehicle runs after the refueling, it can be determined that the amount of absorbed evaporated fuel in the canister 26 is reduced to some extent, thus the closing failure determination of the sealing valve 28 is less likely to cause the blow through of the evaporated fuel. Therefore, if it is determined in Step 118 that there is the running history after the refueling, the determination execution flag XZEVP is turned ON to allow the execution of the closing failure determination of the sealing valve 28 (Step 120).

Then, in the routine shown in FIG. 3, it is determined whether the determination execution flag XZEVP is ON (Step 122).

When it is determined that the determination execution flag XZEVP is not ON, the closing failure determination is not performed thereafter, and the current procedure cycle is finished. On the other hand, if it is determined that the condition of XZEVP=ON is satisfied, the valve opening instruction is first issued to the sealing valve 28 which is in the closed state in order to proceed with the closing failure determination of the sealing valve 28 (Step 124).

Then, it is determined whether the determination execution flag XZEVP is changed from OFF to ON after the former procedure cycle, i.e., at the current procedure cycle (Step 125).

If it is determined that the condition above is not satisfied, a procedure of Step 126 is jumped thereafter. On the other hand, when the condition above is satisfied, tank internal pressure Ptnk_o after the valve opening instruction is issued to the sealing valve 28 is measured (Step 126).

Next, a difference between the tank internal pressure of after valve opening Ptnk_o and the tank internal pressure of before valve opening Ptnk, $\Delta Ptnk=|Ptnk\_o-Ptnk|$, is calculated (Step 128).

Then, it is determined whether the differential pressure ΔPtnk is larger than a predetermined determination value Pth1 (Step 130).

If the sealing valve 28 opens properly upon receiving the valve opening instruction issued in Step 124, a significant differential pressure ΔPtnk larger than the predetermined determination value Pth1 is to occur between the tank internal pressure of after valve opening Ptnk_o and the tank internal pressure of valve opening Ptnk. On the other hand, if the sealing valve 28 does not properly open, no differential pressure ΔPtnk larger than the predetermined determination value Pth1 occurs.

Thus, if it is determined in Step 130 that the condition of ΔPtnk>Pth1 is satisfied, no occurrence is determined of the closing failure in the sealing valve 28 (Step 132).

If it is determined in Step 130 that the condition of ΔPtnk>Pth1 is not satisfied, the occurrence is determined of the closing failure in the sealing valve 28 (Step 134).

As described above, according to the routine shown in FIG. 3, the closing failure of the sealing valve 28 can be accurately determined without leaving the possibility of excessively increasing the tank internal pressure Ptnk after the abnormality detection, and without causing the blow through of the evaporated fuel as the abnormality detection is performed. Thus, according to the device of the present embodiment, it is possible to efficiently detect the closing failure of the sealing valve 28 in a system where the tank internal pressure Ptnk is not made negative by normal control.

Second Embodiment

Figure 4:
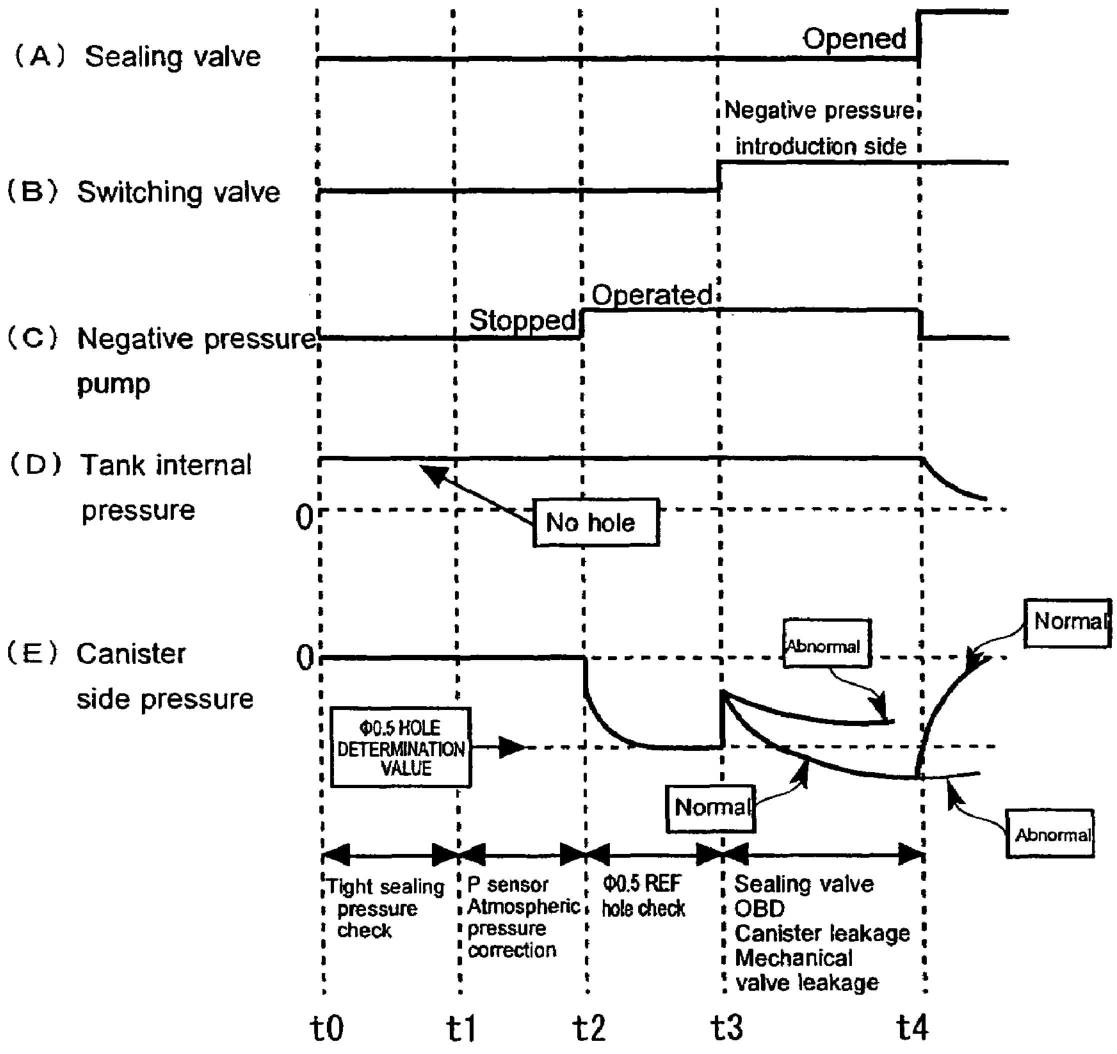
FIGS. 4A through 4E are timing charts for describing an operation of a device according to a second embodiment of the invention.

Next, a second embodiment of the invention will be described with reference to FIGS. 4 and 5. A device according to the present embodiment can be achieved by modifying the device according to the first embodiment such that the ECU 60 performs the closing failure determination of the sealing valve 28 with the below described procedure.

FIGS. 4A through 4E are timing charts for illustrating abnormality detection performed by the device of the present embodiment for detecting abnormality of the sealing valve 28. More specifically, FIG. 4A shows a state of the sealing valve 28, FIG. 4B shows a state of the switching valve 80, and FIG. 4C shows an operation state of the pump 74. FIG. 4D shows a change in tank internal pressure Ptnk (output of the tank internal pressure sensor 12), and FIG. 4E shows a change in canister side pressure Pcani detected by the pump module pressure sensor 86.

In the present embodiment, abnormality detection is performed during the parking of the vehicle from the viewpoint of minimizing influence of various disturbances. However, the abnormality detection is not performed only during the parking of the vehicle, but may be performed during the running of the vehicle.

In the device according to the present embodiment, the sealing valve 28 is also generally closed during the parking of the vehicle, that is, during the stop of the internal combustion engine. The abnormality detection of the sealing valve 28 is started at a time when a predetermined time period has elapsed since the internal combustion engine is stopped. In FIGS. 4A through 4E, time t0 is a time when the soak timer counts the predetermined time period after the internal combustion engine is stopped. Thus, the sealing valve 28 is closed at that time.

The ECU 60 is activated from a standby state at the time t0 in order to start the abnormality detection. In the device according to the present embodiment, the tank internal pressure Ptnk arising in the fuel tank 10 in the tightly sealed state, i.e., tight sealing pressure is first checked after the abnormality detection is started (time t0 to t1).

The tank internal pressure Ptnk shown by a solid line in FIG. 4D shows an example in which the tank internal pressure Ptnk is sufficiently apart from the atmospheric pressure during the checking period of the tight sealing pressure. If there is leakage (a hole) in the fuel tank 10, no tank internal pressure Ptnk apart from the atmospheric pressure arises during this period. Thus, if the ECU 60 detects the tank internal pressure Ptnk sufficiently apart from the atmospheric pressure at this time, the ECU 60 can determine that no leakage occurs in the fuel tank 10.

When the check period of the tight sealing pressure is finished, the ECU 60 then performs atmospheric pressure correction of the pump module pressure sensor 86 (time t1 to t2).

At the time t1, the switching valve 80 is in the nonenergized state. In this case, the pump module pressure sensor 86 is exposed to the atmospheric pressure. Thus, output of the pump module pressure sensor 86 at that time corresponds to the atmospheric pressure. The ECU 60 performs calibration of the pump module pressure sensor 86 based on the output during the time period from t1 to t2.

When the atmospheric pressure correction of the pump module pressure sensor 86 is finished, a ϕ0.5 REF hole check is then performed (time t2 to t3).

In the ϕ0.5 REF hole check, the pump 74 is first turned on (time t2). When the switching valve 80 is in the nonenergized state, a suction port of the pump 74 communicates with the atmosphere via the check valve 76 and the reference orifice 84. When the pump 74 is turned on in this state, the output of the pump module pressure sensor 86 converges to a value (negative pressure value) equal to a value that is output when the pump 74 operates in a state where a reference hole of 0.5 mm is bored in piping.

After the time t2, the ECU 60 waits for the output of the pump module pressure sensor 86, that is, the canister side pressure Pcani to converge to an appropriate value, then stores a converted value as a ϕ0.5 hole determination value. Thereafter, the ϕ0.5 hole determination value is used as a determination value for determining whether leakage through a hole larger than the 0.5 mm reference hole occurs in the evaporated fuel treatment device.

When the φ0.5 REF hole check is finished, sealing valve OBD (on-board diagnosis)/canister leakage/mechanical valve leakage procedure is then performed. This procedure is performed for determining whether any of abnormality of the sealing valve 28, leakage in the canister 26, and leakage in the pressure control valve 30 occurs. In this procedure, the switching valve 80 is first switched from the nonenergized state to an energized state, that is, a negative pressure introduction state (time t3).

When the switching valve 80 is brought to the energized state (negative pressure introduction state), the canister 26 is separated from the atmosphere and communicates with the suction port of the pump 74. Thus, the internal pressure of the canister 26 is reduced, and the canister side pressure Pcani gradually becomes negative. When the sealing valve 28 is properly closed, and no leakage occurs in the canister 26 and the pressure control valve 30, the canister side pressure Pcani is relatively rapidly reduced after the time t3. On the other hand, when the sealing valve 28 is not properly closed, or the leakage occurs in the canister 26 or the pressure control valve 30, the canister side pressure Pcani is slowly reduced after the time t3 (see FIG. 4E).

Thus, when the canister side pressure Pcani is rapidly reduced below the φ0.5 hole determination value after the time t3, the ECU 60 determines that the sealing valve 28 is properly closed, and no leakage occurs in the canister 26 and the pressure control valve 30, that is, that the system is normal. On the other hand, when the canister side pressure Pcani is slowly reduced, the ECU 60 determines that opening failure occurs in the sealing valve 28, or the leakage occurs in the canister 26 or the pressure control valve 30.

When the system is normal, the ECU 60 then performs a procedure for determining whether the closing failure occurs in the sealing valve 28. Specifically, a procedure of issuing a valve opening instruction to the sealing valve 28 and a procedure of stopping the pump 74 are performed (time t4).

When no opening failure occurs in the sealing valve 28, the canister side pressure Pcani (internal pressure of the canister 26) is usually sufficiently lower than the tank internal pressure Ptnk at the time t4. Thus, if the sealing valve 28 properly opens in response to the valve opening instruction, the canister side pressure Pcani significantly increases after the time t4. On the other hand, if the closing failure occurs in the sealing valve 28, the canister side pressure Pcani is kept substantially constant before and after the time t4. Thus, when there is a sufficient change in the canister side pressure Pcani after the time t4, the ECU 60 determines that no closing failure occurs in the sealing valve 28. On the other hand, when there is no change in the canister side pressure Pcani, the ECU 60 determines that the closing failure occurs in the sealing valve 28.

[Description of Procedure Performed by ECU]

Figure 5:
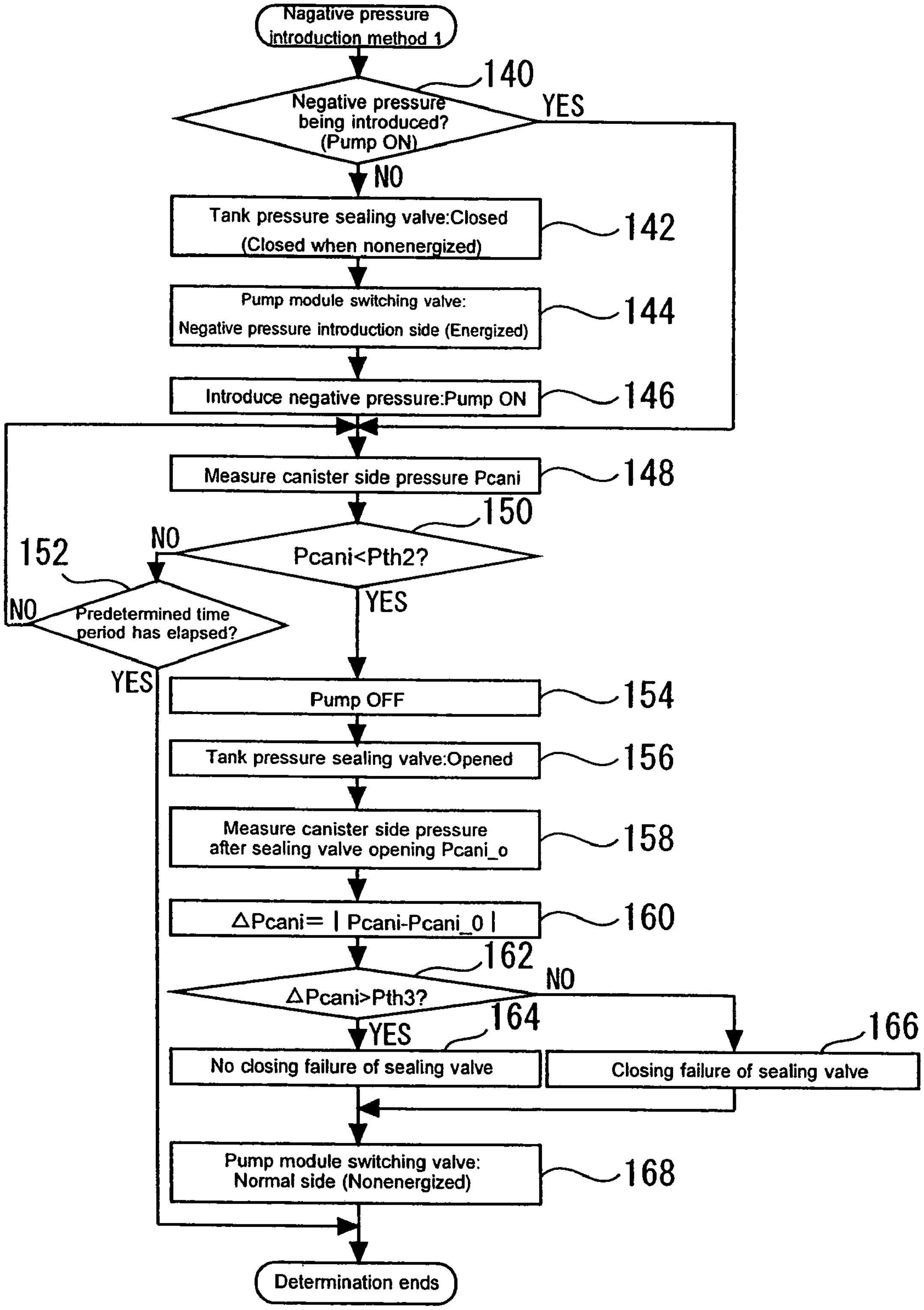
FIG. 5 is a flowchart of a control routine performed in the second embodiment of the invention.

FIG. 5 is a flowchart of a control routine performed by the ECU 60 particularly for detecting the closing failure of the sealing valve 28, among the above described series of abnormality detection procedures. In the timing charts shown in FIGS. 4A through 4E, this routine is performed after the φ0.5 REF hole check is finished. It should be noted that, other than being performed as a part of the series of abnormality detection procedures shown in FIGS. 4A through 4E, this routine can be drawn from the series of procedures to be performed as an independent procedure for detecting the closing failure of the sealing valve 28.

In the routine shown in FIG. 5, it is first determined whether the negative pressure is being introduced, that is, whether the pump 74 is in operation and the negative pressure generated by the pump 74 is introduced into the canister 26 (whether the switching valve 80 is in the negative pressure introducing state) (Step 140).

If it is determined that introduction of the negative pressure has already started, procedures of Steps 142 to 146 are jumped thereafter, and procedures after Step 148 are performed immediately. On the other hand, if it is determined that the negative pressure is not yet being introduced, the sealing valve 28 is closed, the switching valve 80 is brought to the negative pressure introducing state, and the pump 74 is turned on (Steps 142, 144, 146).

When this routine is performed as a part of the series of abnormality detection procedures shown in FIGS. 4A through 4E, the sealing valve 28 is already closed and the pump 74 is on at the time t3. Thus, in this case, the procedures of Steps 142 and 146 may be omitted.

In the routine shown in FIG. 5, the canister side pressure Pcani (in this case, the internal pressure of the canister 26) is then measured based on the output of the pump module pressure sensor 86 (Step 148).

Then, it is determined whether the canister side pressure Pcani is reduced below negative pressure determined pressure Pth2 (Step 150).

If it is determined that the condition of Pcani<Pth2 is not yet satisfied, it is then determined whether a predetermined time period has elapsed since the negative pressure introduction is started (Step 152).

Then, if it is determined that the predetermined time period has not yet elapsed, the procedure of Step 148 is performed again. On the other hand, if it is determined that the predetermined time period has elapsed, a possibility is noticed that the opening failure occurs in the sealing valve 28. Thus the current procedure cycle is finished without proceeding with the closing failure determination.

When this routine is performed as a part of the series of abnormality detection procedures shown in FIGS. 4A through 4E, the negative pressure determination value Pth2 in Step 150 is set to the φ0.5 hole determination value. The predetermined time period in Step 152 is a maximum time period required for the canister side pressure Pcani to reach below the negative pressure determination value Pth2 under a condition where the sealing valve 28 is properly closed and there is no leakage in the system.

In the above case, the reason why the negative pressure determination value Pth2 is set to the φ0.5 hole determination value is determining whether leakage through a hole larger than the φ0.5 hole occurs or not in the system during the process of the negative pressure introduction. Thus, when the routine is performed independently of the series of abnormality detection procedures shown in FIGS. 4A through 4E, that is, when there is no need for determining in the routine whether the leakage through the hole larger than the φ0.5 hole occurs in the system, the negative pressure determination value Pth2 is not necessarily required to be set to the φ0.5 hole determination value. In this case, the negative pressure determination value Pth2 may be usually set to an appropriate value that is expected to cause a significant difference from the tank internal pressure Ptnk, in the state where the sealing valve 28 is properly closed. Further, in this case, the predetermined time period in Step 152 may be set to the maximum time period required for the canister side pressure Pcani to reach below the negative pressure determination value Pth2 in the state where the system is normal.

According to the series of procedures, if it is determined in Step 150 that the condition of Pcani<Pth2 is satisfied, it can be determined that no opening failure occurs in the sealing valve 28, and a significant difference is caused between the canister side pressure Pcani and the tank internal pressure Ptnk. In the routine shown in FIG. 5, the pump 74 is turned off at this stage, the valve opening instruction is then issued to the sealing valve 28, followed by a measurement of canister side pressure after valve opening instruction Pcani_o (Steps 154, 156, 158).

Then, a difference between the canister side pressure Pcani measured in Step 148 and the canister side pressure after valve opening instruction Pcani_o, that is, the difference in the canister side pressure between before and after the valve opening instruction is issued, $\Delta$Pcani=|Pcani−Pcani_o| is calculated (Step 160).

When the difference $\Delta$Pcani is calculated, it is determined whether the difference $\Delta$Pcani is larger than a predetermined determination value Pth3 (Step 162).

If the sealing valve 28 opens properly upon receiving of the valve opening instruction issued in Step 156, a significant difference $\Delta$Pcani larger than the predetermined determination value Pth3 occurs between the canister side pressure before valve opening Pcani and the canister side pressure after valve opening Pcani_o. On the other hand, if the sealing valve 28 does not properly open, no differential pressure $\Delta$Pcani larger than the predetermined determination value Pth3 is generated.

Thus, if it is determined in Step 162 that the condition of $\Delta$Pcani>Pth3 is satisfied, no occurrence is determined of the closing failure in the sealing valve 28 (Step 164).

On the other hand, if it is determined in Step 162 that the condition of $\Delta$Pcani>Pth3 is not satisfied, occurrence is determined of the closing failure in the sealing valve 28 (Step 166).

When the series of procedures described above are finished, the switching valve 80 is returned to the nonenergized state (Step 168), and then the current procedure cycle is finished.

As described above, according to the routine shown in FIG. 5, it is possible to accurately determine whether the closing failure occurs in the sealing valve 28 depending on whether a proper pressure change occurs in the canister side pressure Pcani in response to the valve opening instruction which is issued to the sealing valve 28 after introduction of the negative pressure into the canister 26. Thus, according to the device of the present embodiment, the closing failure of the sealing valve 28 can be efficiently detected in the system where the tank internal pressure Ptnk is not made negative by normal control.

In the second embodiment described above, whether or not the closing failure occurs in the sealing valve 28 is determined depending on whether the significant change occurs in the canister side pressure Pcani in response to the valve opening instruction to the sealing valve 28, after the negative pressure is introduced into the canister 26 with the sealing valve 28 being closed. However, the method for determining the occurrence of the closing failure is not limited to this. For example, the determination may be performed depending on whether a significant change occurs in the tank internal pressure Ptnk in response to the valve opening instruction to the sealing valve 28. Alternatively, the determination may be performed depending on whether a change occurs in the tank internal pressure Ptnk under a situation where the negative pressure is introduced with the sealing valve 28 being opened.

In the second embodiment described above, diagnosis of the closing failure is stopped when it requires the predetermined time period for the canister side pressure Pcani to reach below the negative pressure determination value Pth2, because there is the possibility that the opening failure occurs in the sealing valve 28 (see Step 152). However, the invention is not limited to this. The diagnosis of the closing failure may be performed without considering the possibility of the opening failure. That is, the diagnosis of the closing failure is performed by repeating Steps 148 and 150 until the condition of Pcani<PthL2 is satisfied. In this case, when the condition of $\Delta$Pcani>Pth3 is not satisfied in Step 162, the determination on the closing failure may be suspended, and normality determination of "no closing failure" may be ensured only when the condition is satisfied.

Third Embodiment

Next, a third embodiment of the invention will be described with reference to FIG. 6. An evaporated fuel treatment device according to the present embodiment can be achieved by modifying the device according to the second embodiment such that the ECU 60 performs a routine shown in FIG. 6 instead of the routine shown in FIG. 5.

Figure 6:
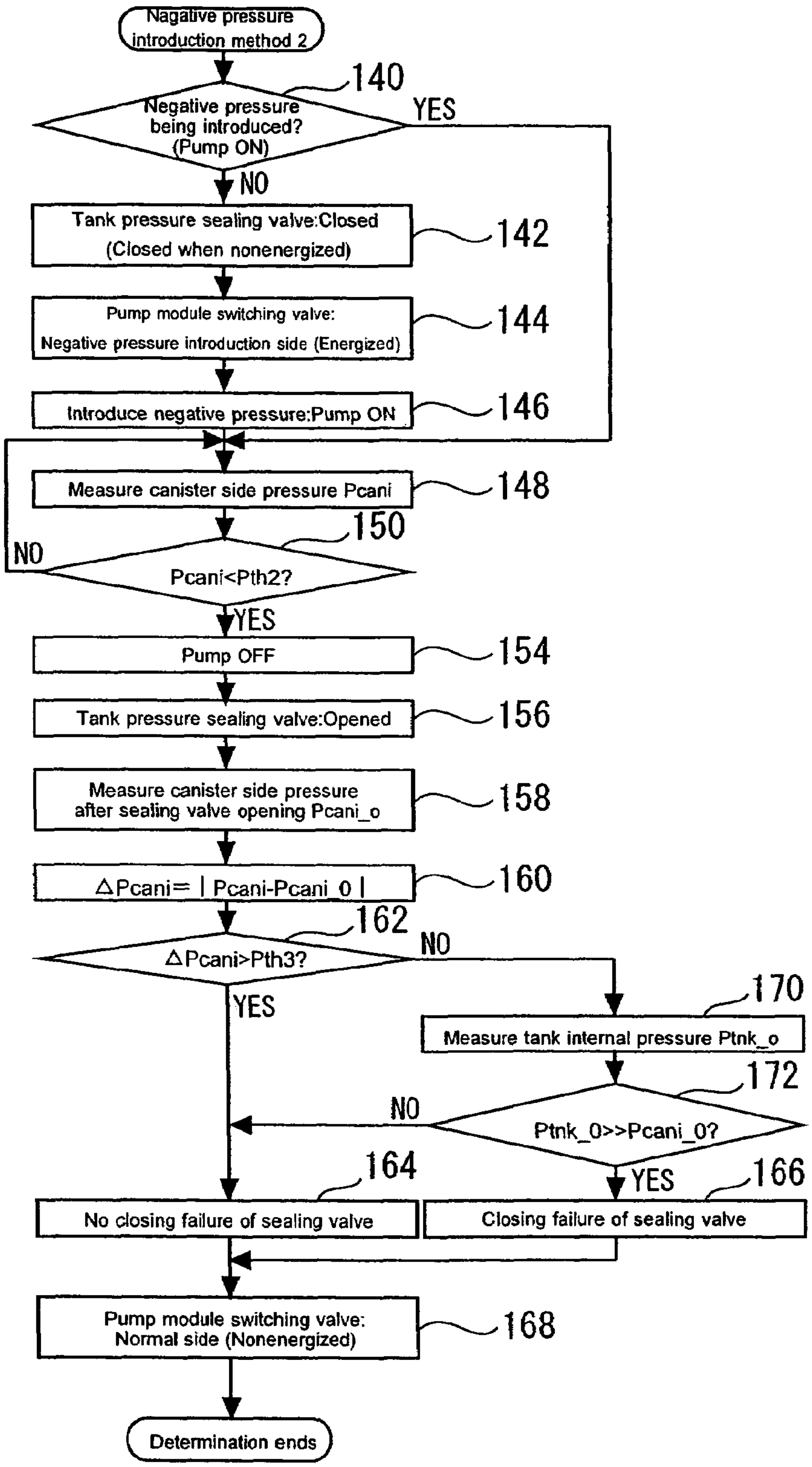
FIG. 6 is a flowchart of a control routine performed in a third embodiment of the invention.

FIG. 6 is a flowchart of a control routine performed by the ECU 60 in the present embodiment for determining whether closing failure occurs in the sealing valve 28. The routine shown in FIG. 6 is the same as the routine shown in FIG. 5, except that Step 152 is omitted, and Steps 170 to 172 are added. In FIG. 6, like reference numerals denote like steps as in FIG. 5, and descriptions thereof will be omitted or simplified.

In the routine shown in FIG. 6, after negative pressure introduction is started (Steps 140 to 146) and until canister side pressure Pcani reaches below a negative pressure determination value Pth2 (Step 150), procedures of Steps 148 and 150 are repeated regardless of an elapsed time period. Even if opening failure occurs in the sealing valve 28, the canister side pressure Pcani reaches below the predetermined pressure Pth2 given that the negative pressure introduction is continued for a long period. Thus, the condition of Step 150 is sometimes satisfied in the routine shown in FIG. 6, unlike the routine shown in FIG. 5, even if the opening failure occurs in the sealing valve 28.

In the routine shown in FIG. 6, when the condition of Step 150 is satisfied, it is determined whether significant differential pressure $\Delta$Pcani is generated in the canister side pressure Pcani between before and after a valve opening instruction to the sealing valve 28, as in the second embodiment (Steps 154 to 162).

Also in this routine, when a judgment is made in Step 162 that the condition of $\Delta$Pcani>Pth3 is satisfied, it can be determined that the sealing valve 28 is normally changed from the closed state to the opened state in response to the valve opening instruction, that is, that no opening failure nor closing failure occurs in the sealing valve 28. In this case, after procedures of Steps 164 and 168 are performed, the procedure cycle is finished, as in the second embodiment.

In the routine shown in FIG. 6, the procedure of Step 162 is sometimes performed when the opening failure occurs in the sealing valve 28, besides when the closing failure occurs in the sealing valve 28. In the case of either failure, it is determined in Step 162 that the condition of $\Delta$Pcani>Pth3 is not satisfied. Thus, in this routine, when it is determined in Step 162 that the condition is not satisfied, tank internal pressure Ptnk_o at that time is first measured (Step 170), then it is determined whether the tank internal pressure Ptnk_o is sufficiently higher than canister side pressure Pcani_o after the valve opening instruction is issued (Step 172).

When Ptnk_o is sufficiently higher than Pcani_o, it can be determined that the sealing valve 28 is closed at that time. Thus, in this case, it can be determined that no opening failure occurs in the sealing valve 28, and that a cause which prevents occurrence of the significant differential pressure $\Delta$Pcani is the closing failure of the sealing valve 28. When such determination is made in Step 172, the closing failure of the sealing valve 28 is thereafter determined in Step 166 in the routine shown in FIG. 6.

On the other hand, when a judgment is made that Ptnk_o is not sufficiently higher than Pcani_o, it can be determined that the sealing valve 28 is opened at that time. Thus, in this case, it can be determine that a cause which prevents the occurrence of the significant differential pressure ΔPcani is the opening failure of the sealing valve 28. When such determination is made in Step 172, it is thereafter determined in Step 164 that no closing failure occurs in the sealing valve 28.

As described above, according to the routine shown in FIG. 6, it can be accurately determined whether the closing failure occurs in the sealing valve 28 as in the routine shown in FIG. 5. Thus, according to the device of the present embodiment, the closing failure of the sealing valve 28 can be efficiently detected in the system where the tank internal pressure Ptnk is not made negative by normal control.

In the third embodiment described above, whether or not the closing failure occurs in the sealing valve 28 is determined depending on whether the significant change occurs in the canister side pressure Pcani in response to the valve opening instruction to the sealing valve 28, after the negative pressure is introduced into the canister 26 with the sealing valve 28 being closed. However, the method for determining the occurrence of the closing failure is not limited to this. For example, the determination may be performed depending on whether a significant change occurs in the tank internal pressure Ptnk in response to the valve opening instruction to the sealing valve 28. Alternatively, the determination may be performed depending on whether a change occurs in the tank internal pressure Ptnk under a situation where the negative pressure is introduced with the sealing valve 28 being opened.

Fourth Embodiment

Next, a fourth embodiment of the invention will be described with reference to FIG. 7. An evaporated fuel treatment device according to the present embodiment can be achieved by modifying the device according to the second embodiment or the third embodiment such that the ECU 60 performs a routine shown in FIG. 7 instead of the routine shown in FIG. 5 or 6.

Figure 7:
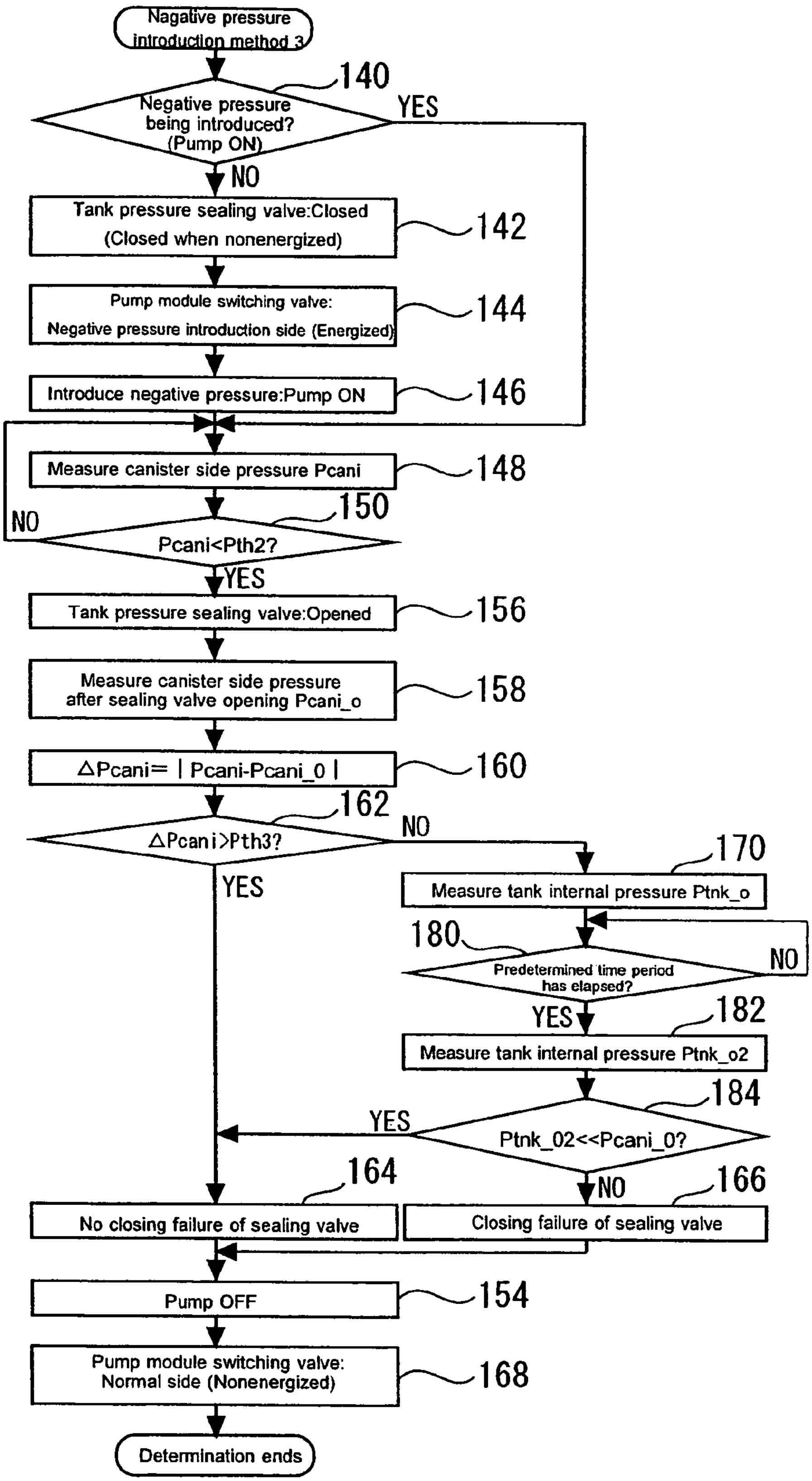
FIG. 7 is a flowchart of a control routine performed in a fourth embodiment of the invention.

FIG. 7 is a flowchart of a control routine performed by the ECU 60 in the present embodiment for determining whether closing failure occurs in the sealing valve 28. The routine shown in FIG. 7 is the same as the routine shown in FIG. 6, except that Step 154 for turning off the pump 74 is moved from immediately before Step 156 to immediately before Step 168, and the procedure of Step 172 is replaced by Steps 180 to 184. In FIG. 7, like reference numerals denote like steps as in FIG. 6, and descriptions thereof will be omitted or simplified.

In the routine shown in FIG. 7, after negative pressure introduction is completed (Step 150), procedures of and after Step 156 are performed without the pump 74 being turned off, that is, with the negative pressure introduction into the canister 26 being continued. When it is determined in Step 162 that a meaningful difference ΔPcani occurs in canister side pressure Pcani between before and after a valve opening instruction, it is determined in Step 164 that no closing failure occurs in the sealing valve 28, as in the third embodiment.

On the other hand, when it is determined in Step 162 that the condition of ΔPcani>Pth3 is not satisfied, the procedure of Step 170 is performed to measure tank internal pressure Ptnk_o at that time, that is, at a time immediately after the valve opening instruction is issued. Then, elapse of a predetermined time period is awaited (Step 180).

When it is determined in Step 180 that the predetermined time period has elapsed, tank internal pressure Ptnk_o2 at that time is measured (Step 182), followed by a determination whether or not the tank internal pressure Ptnk_o2 is sufficiently lower than the tank internal pressure Ptnk_o measured in Step 170.

In a case where Ptnk_o2 is sufficiently lower than Ptnk_o, it can be determined that the negative pressure is continuously introduced into the fuel tank 10 after the procedure of Step 170 is performed. That is, in this case, it can be determined that no closing failure occurs in the sealing valve 28, and that a cause which prevents occurrence of the meaningful differential pressure ΔPcani is the opening failure of the sealing valve 28. When such determination is made in Step 184, it is thereafter determined in Step 164 that no closing failure occurs in the sealing valve 28 in the routine shown in FIG. 7.

When Ptnk_o2 is not sufficiently lower than Ptnk_o, it can be determined that no negative pressure is introduced into the fuel tank 10 after the procedure of Step 170 is performed. Thus, in this case, it can be determined that the sealing valve 28 does not properly open in spite of the valve opening instruction. When such determination is made in Step 184, the closing failure of the sealing valve 28 is thereafter determined in Step 166 in the routine shown in FIG. 7.

As described above, according to the routine shown in FIG. 7, it can be accurately determined whether the closing failure occurs in the sealing valve 28 as in the case where the routine shown in FIG. 6 is performed. Thus, according to the device of the present embodiment, the closing failure of the sealing valve 28 can be efficiently detected in the system where the tank internal pressure Ptnk is not made negative by normal control.

In the fourth embodiment described above, whether or not the closing failure occurs in the sealing valve 28 is determined depending on whether the meaningful change occurs in the canister side pressure Pcani in response to the valve opening instruction to the sealing valve 28, after the negative pressure is introduced into the canister 26 with the sealing valve 28 being closed. However, the method for determining the occurrence of the closing failure is not limited to this. For example, the determination may be performed depending on whether a meaningful change occurs in the tank internal pressure Ptnk in response to the valve opening instruction to the sealing valve 28.

Fifth Embodiment

Next, a fifth embodiment of the invention will be described with reference to FIG. 8. An evaporated fuel treatment device according to the present embodiment can be achieved by modifying any one of the devices according to the second embodiment through the fourth embodiment such that the ECU 60 performs a routine shown in FIG. 8 instead of the routine shown in FIG. 5, 6 or 7.

Figure 8:
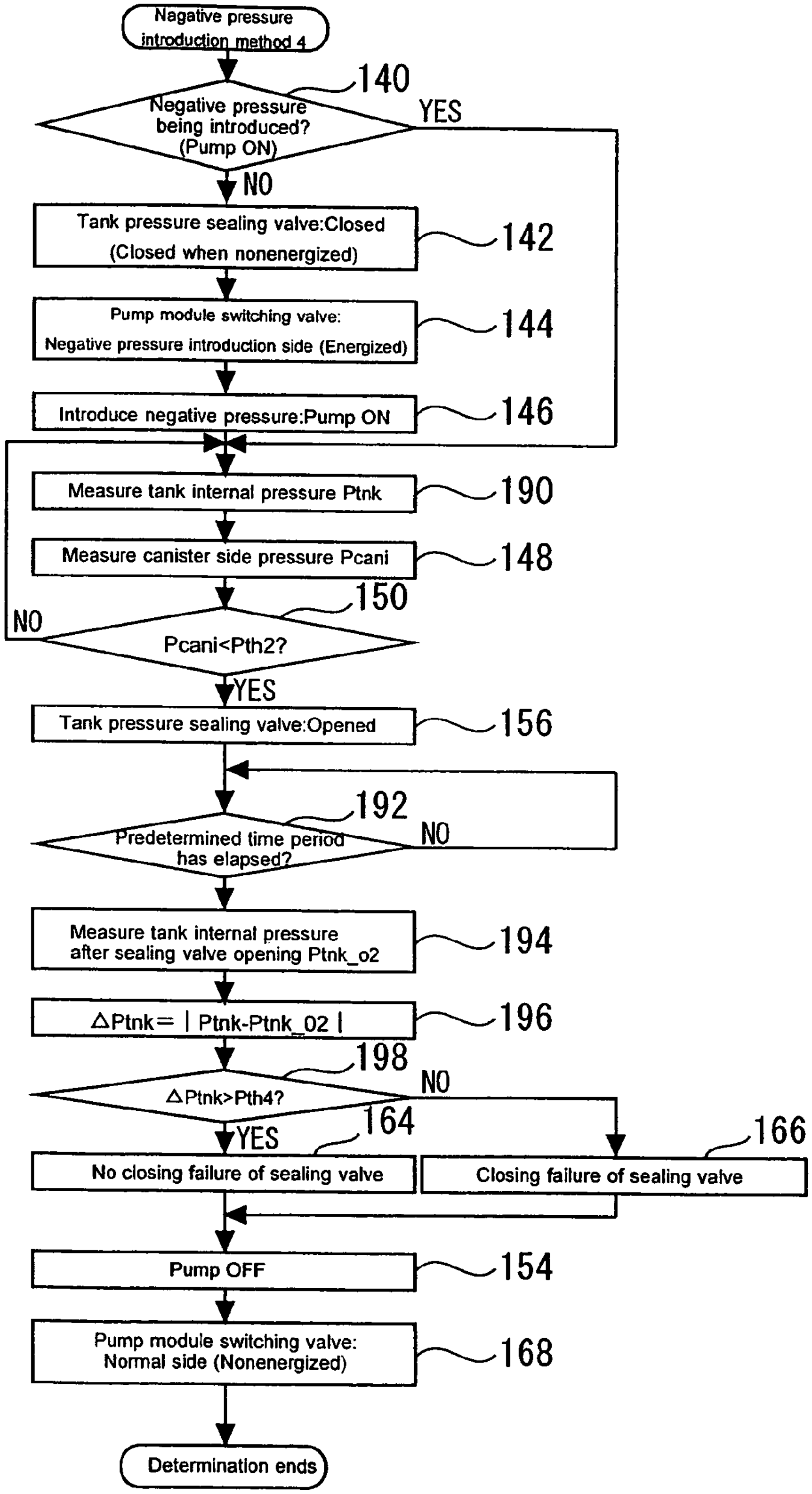
FIG. 8 is a flowchart of a control routine performed in a fifth embodiment of the invention.

FIG. 8 is a flowchart of a control routine performed by the ECU 60 in the present embodiment for determining whether closing failure occurs in the sealing valve 28. The routine shown in FIG. 8 is the same as the routine shown in FIG. 7, except that Step 190 is inserted immediately before Step 148 for measuring tank internal pressure Ptnk before a valve opening instruction is issued, and the procedure executed after Step 156 for determining whether the closing failure occurs is replaced by Steps 192 through 198. In FIG. 8, like reference numerals denote like steps as in FIG. 7, and descriptions thereof will be omitted or simplified.

In the routine shown in FIG. 8, after negative pressure introduction is started (Steps 140 to 146), the latest tank internal pressure Ptnk is repeatedly measured (Step 190) until canister side pressure Pcani reaches below a negative pressure determination value Pth2.

If it is recognized that Pcani reaches below Pth2 (Step 150), the valve opening instruction is issued to the sealing valve 28 (Step 156). Then, elapse of a predetermined time period is awaited (Step 192).

When it is determined in Step 192 that the predetermined time period has elapsed, tank internal pressure Ptnk_o2 at that time is then measured (Step 194). Further, a difference between the tank internal pressure Ptnk measured before the valve opening instruction is issued and the tank internal pressure Ptnk_o2 measured in Step 194, $\Delta Ptnk=|Ptnk-Ptnk\_o2|$, is calculated (Step 196). Next, it is determined whether the difference ΔPtnk is larger than a predetermined determination value Pth4 (Step 198).

The difference ΔPtnk is a pressure change that occurs in the tank internal pressure Ptnk while the predetermined time period elapses after the valve opening instruction is issued to the sealing valve 28. The sealing valve 28 is normally closed before the valve opening instruction. In a case where the sealing valve 28 is normally opened in response to the valve opening instruction, the opening of the valve causes a great change in the tank internal pressure Ptnk. Thus, in this case, the difference ΔPtnk becomes a meaningful value (a value larger than the predetermined determination value Pth4).

In a case where the sealing valve 28 has been opened since before the valve opening instruction, no great change occurs in the tank internal pressure Ptnk between before and after the valve opening instruction. However, in this case, the negative pressure is continuously introduced into the fuel tank 10 while the predetermined time period elapses after the valve opening instruction is issued. Thus, also in this case, the difference ΔPtnk becomes a meaningful value (a value larger than the predetermined determination value Pth4).

It should be noted that the above described two cases where ΔPtnk becomes the meaningful value are cases in which no closing failure occurs in the sealing valve 28. Thus, in the routine shown in FIG. 8, when a judgment is made in Step 198 that the condition of $\Delta Ptnk>Pth4$ is satisfied, the procedure of Step 164 is thereafter performed to determine that no closing failure occurs in the sealing valve 28.

On the other hand, if a judgment is made in Step 198 that the condition of $\Delta Ptnk>Pth4$ is not satisfied, it can be determined that the tank internal pressure Ptnk is not reduced though the negative pressure introduction is continued after the valve opening instruction. In this case, it is possible to determine that the closing failure occurs in the sealing valve 28. Thus, in the routine shown in FIG. 8, when the condition of Step 198 is not satisfied, the procedure of Step 166 is thereafter performed to determine that the closing failure occurs in the sealing valve 28.

As described above, according to the routine shown in FIG. 8, it is possible to accurately determine whether or not the closing failure occurs in the sealing valve 28 as in the case where the routine shown in FIG. 6 or 7 is executed. Thus, according to the device of the present embodiment, the closing failure of the sealing valve 28 can be efficiently detected in the system where the tank internal pressure Ptnk is not made negative by normal control.

Sixth Embodiment

Figure 9:
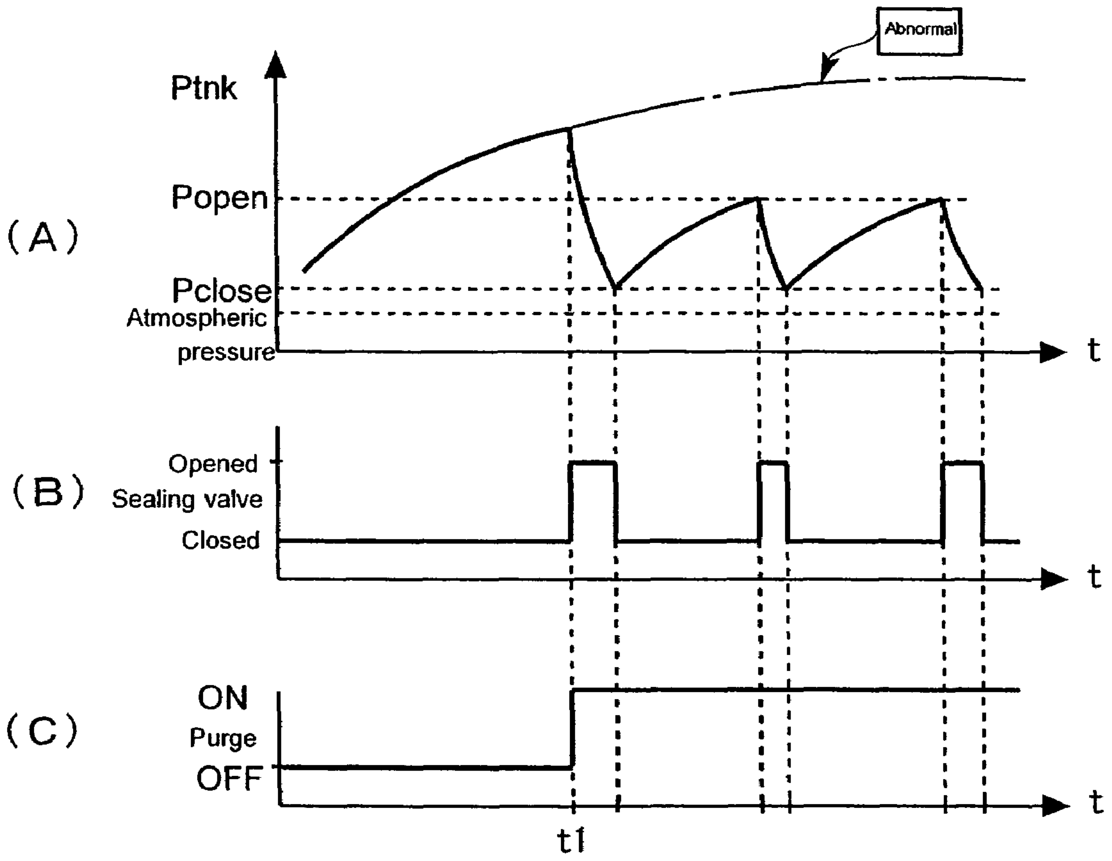
FIGS. 9A through 9C are timing charts for describing an operation of a device according to a sixth embodiment of the invention.

Next, a sixth embodiment of the invention will be described with reference to FIGS. 9 and 10. An evaporated fuel treatment device according to the present embodiment can be achieved by modifying the device according to the first embodiment such that the ECU 60 performs the below described routine shown in FIG. 10 instead of or together with the routine shown in FIG. 3.

Like the device according to the first embodiment, the device according to the present embodiment appropriately opens the sealing valve 28 generally simultaneously with performance of a purge to keep tank internal pressure Ptnk near the atmospheric pressure during the running of the vehicle (during the operation of the internal combustion engine). FIGS. 9A through 9C are timing charts for illustrating an operation of the device with the sealing valve 28 being thus controlled. More specifically, FIG. 9A shows a waveform of the tank internal pressure Ptnk during the operation of the internal combustion engine, FIG. 9B is an opened/closed state of the sealing valve 28, and FIG. 9C shows an ON/OFF state of the purge.

FIGS. 9A though 9C show an example where the purge is off until time t1, and the purge is turned on at time t1. While the purge is off, the sealing valve 28 is generally kept in the closed state. In such a situation, the tank internal pressure Ptnk is sometimes greatly apart from the atmospheric pressure.

While the purge is on, if the tank internal pressure Ptnk exceeds predetermined valve opening pressure Popen, a valve opening instruction is issued to the sealing valve 28 for decompression. If the sealing valve 28 properly opens in response to the valve opening instruction, a gas in the fuel tank 10 is released into the canister 26, and the tank internal pressure Ptnk is reduced toward the atmospheric pressure (see a waveform indicated by a solid line in FIG. 9A). On the other hand, when the sealing valve 28 does not open abnormally, the gas in the tank is not released, and thus the tank internal pressure Ptnk is continuously kept at a high value (see a waveform indicated by a single dot dashed line in FIG. 9A).

The ECU 60 opens the sealing valve 28, and then closes the sealing valve 28 at a time when the tank internal pressure Ptnk is reduced to predetermined valve closing pressure Pclose (<Popen). Thus, the tank internal pressure Ptnk is kept between the valve opening pressure Popen and the valve closing pressure Pclose during the performance of the purge as long as the system is normal.

In the system according to the present embodiment, the tank internal pressure Ptnk never increases to the valve opening pressure Popen when the sealing valve 28 opens. Thus, if the tank internal pressure Ptnk reaches the valve opening pressure Popen, it can be determined that the sealing valve 28 is closed at that time. Provided that the sealing valve 28 opens in such a state, the tank internal pressure Ptnk is to be greatly reduced due to the valve opening. Thus, when there is no sign of such reduction in the tank internal pressure Ptnk, it can be determined that the closing failure occurs in the sealing valve 28. Therefore, the device according to the present embodiment determines whether or not the closing failure occurs in the sealing valve 28 depending on whether significant reduction occurs in the tank internal pressure Ptnk after the valve opening instruction at a time when the instruction is issued to the sealing valve 28 under a condition where the purge is performed.

Figure 10:
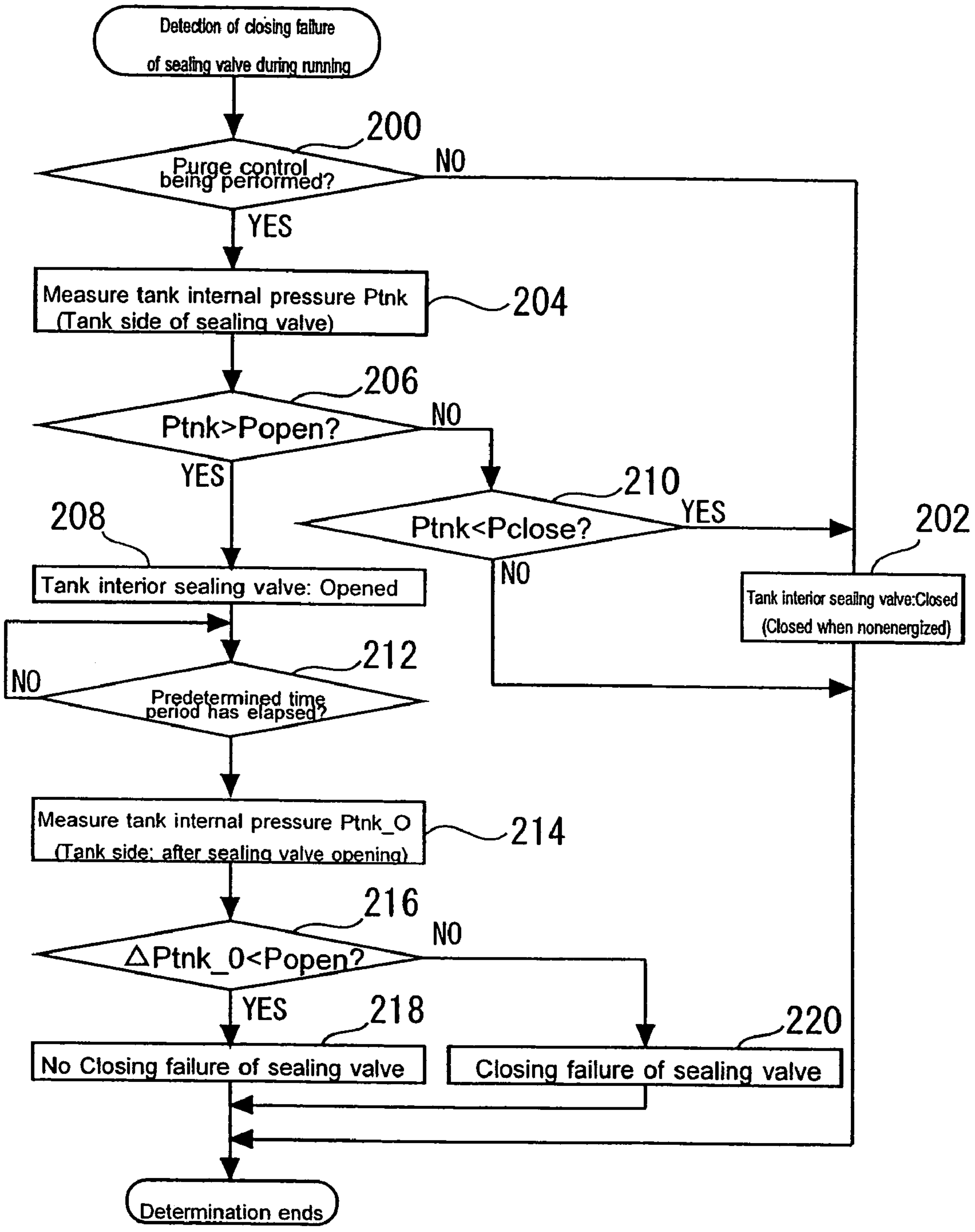
FIG. 10 is a flowchart of a control routine performed in the sixth embodiment of the invention.

FIG. 10 is a flowchart of a control routine executed by the ECU 60 in the present embodiment for detecting the closing failure of the sealing valve 28 according to the above described principle. In this routine, it is first determined whether the purge of the evaporated fuel is performed in the internal combustion engine (Step 200). If it is determined that no purge is performed, the sealing valve 28 is closed to keep the fuel tank 10 in a tightly sealed state (Step 202).

On the other hand, when it is determined in Step 200 that the purge is performed, the tank internal pressure Ptnk at the time is first measured (Step 204). Then, it is determined whether the tank internal pressure Ptnk exceeds predetermined valve opening pressure (for example, 1.6 kPa) (Step 206).

If a judgment is made that the condition of Ptnk>Popen is satisfied, the valve opening instruction is thereafter issued to the sealing valve 28 (Step 208). When the sealing valve 28 properly opens in response to the valve opening instruction, the tank internal pressure Ptnk immediately reaches below the valve opening pressure Popen. Thus, in that case, it is determined that the condition of Ptnk>Popen is not satisfied when the procedure of Step 206 is performed in a next procedure cycle.

In the routine shown in FIG. 10, when a judgment is made in Step 206 that the condition of Ptnk>Popen is not satisfied, it is then determined whether the tank internal pressure Ptnk reaches below predetermined valve closing pressure Pclose (Step 210). If it is determined that the condition of Ptnk<Pclose is not yet satisfied, the current procedure cycle is finished without any procedure thereafter. Thus, the sealing valve 28 is kept in the opened state.

On the other hand, when a judgment is made in Step 210 that the condition of Ptnk<Pclose is satisfied, the procedure of Step 202 is performed to close the sealing valve 28. When the sealing valve 28 is closed by this procedure, the tank internal pressure Ptnk may starts increasing again if the evaporated fuel is generated in some conditions.

During a process where the tank internal pressure Ptnk increases toward the valve opening pressure Popen after the sealing valve 28 is closed, a judgment is made in Step 206 that the condition of Ptnk>Popen is not satisfied, and in Step 210 that the condition of Ptnk<Pclose is not satisfied. In this case, the procedure cycle is finished without any procedure being executed, and thus the sealing valve 28 is kept in the closed state. Therefore, the procedures of Steps 200 through 210 described above can achieve a function of keeping the tank internal pressure Ptnk between the valve opening pressure Popen and the valve closing pressure Pclose as long as the system is normal.

In the routine shown in FIG. 10, after the procedure of Step 208 is performed, that is, after the procedure of opening the sealing valve 28 is performed, elapse of a time period required for the tank internal pressure Ptnk to decrease to a certain degree is awaited (Step 212) before tank internal pressure Ptnk_o is measured (Step 214). Then, it is determined whether the tank internal pressure Ptnk_o is sufficiently lower than the valve opening pressure Popen (Step 216).

When the sealing valve 28 properly opens upon receiving of the valve opening instruction issued in Step 208, great decompression occurs in the tank internal pressure Ptnk between before and after the instruction. In this case, the tank internal pressure Ptnk_o becomes sufficiently lower than the valve opening pressure Popen. On the other hand, when the sealing valve 28 does not properly open, the tank internal pressure Ptnk_o after the valve opening instruction becomes higher than the valve opening pressure Popen.

Thus, when a judgment is made in Step 216 that the condition of Ptnk_o<Popen is satisfied, it is determined that no closing failure occurs in the sealing valve 28 (Step 218). When ajudgment is made in Step 216 that the condition of Ptnk_o<Popen is not satisfied, it is determined that the closing failure occurs in the sealing valve 28 (Step 220).

As described above, according to the routine shown in FIG. 10, it can be accurately determined whether the closing failure occurs in the sealing valve 28 while the tank internal pressure Ptnk is controlled to a value near the atmospheric pressure during the operation of the internal combustion engine. Thus, according to the present embodiment, the closing failure of the sealing valve 28 can be efficiently detected in the system where the tank internal pressure Ptnk is not made negative by normal control.

Seventh Embodiment

Next, a seventh embodiment of the invention will be described with reference to FIG. 11. An evaporated fuel treatment device according to the present embodiment can be achieved by modifying the device according to the first embodiment such that the ECU 60 performs the below described routine shown in FIG. 11 instead of or together with the routine shown in FIG. 3.

The device according to the sixth embodiment described above appropriately opens the sealing valve 28 simultaneously with the performance of the purge during the running of the vehicle (during the operation of the internal combustion engine), and judges the closing failure of the sealing valve 28 when no significant decompression occurs in the tank internal pressure Ptnk as the valve opens. By contrast, the device according to the present embodiment judges the closing failure of the sealing valve 28 if excessively high tank internal pressure Ptnk is detected while the sealing valve 28 is controlled similarly as in the sixth embodiment.

Figure 11:
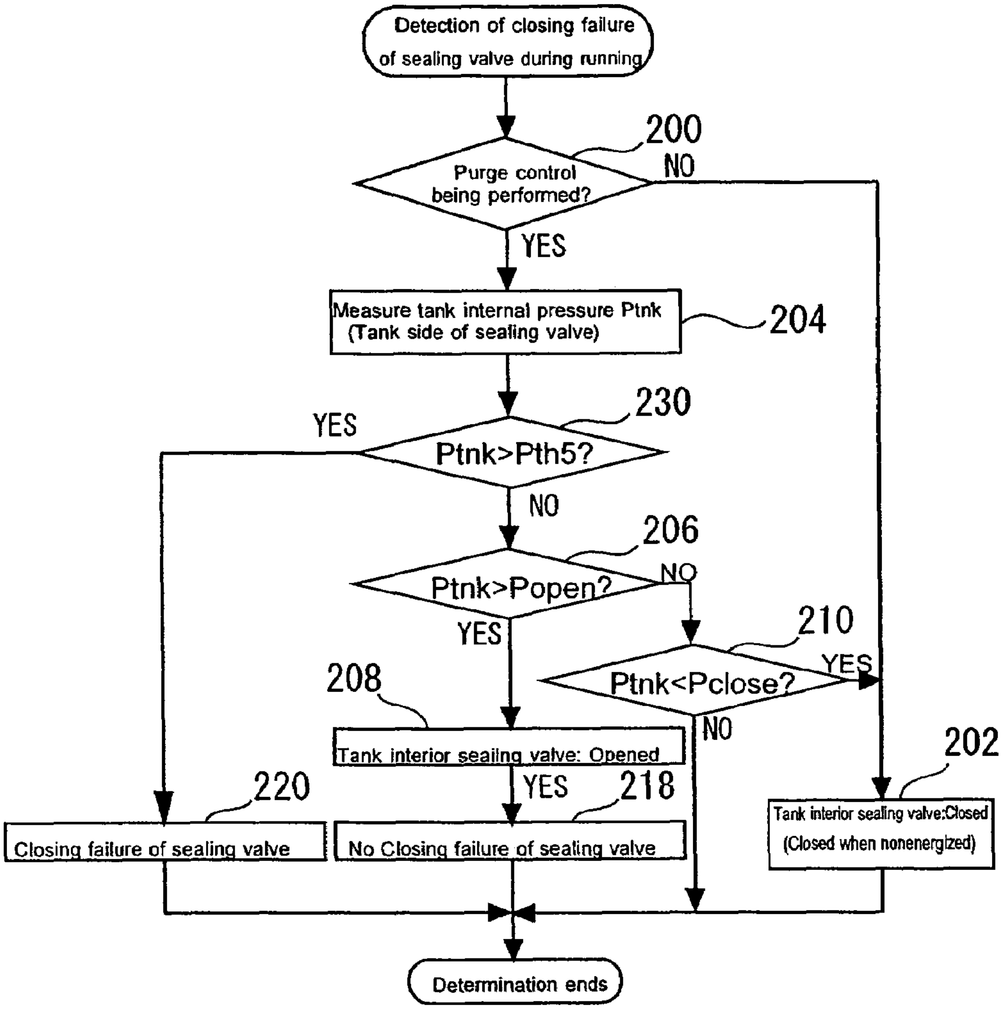
FIG. 11 is a flowchart of a control routine performed in a seventh embodiment of the invention.

FIG. 11 is a flowchart of a control routine performed by the ECU 60 in the present embodiment for judging the closing failure of the sealing valve 28. In FIG. 11, like reference numerals denote like steps as in FIG. 10, and descriptions thereof will be omitted or simplified.

In the routine shown in FIG. 11, following the procedure of Step 204, it is determined whether the tank internal pressure Ptnk exceeds a predetermined determination value Pth5 (Step 230). The predetermined determination value Pth5 is higher than valve opening pressure Popen (for example, 1.6 kPa), and lower than forward direction valve opening pressure (for example 20 kPa) of the pressure control valve 30. Thus, the condition of Step 230 is not satisfied as long as the sealing valve 28 can be properly opened.

When the condition of Step 230 is not satisfied, the tank internal pressure Ptnk is kept between the valve opening pressure Popen and valve closing pressure Pclose while the routine shown in FIG. 11 is repeatedly performed. Further, no occurrence of the closing failure in the sealing valve 28 is judged in this case. The procedure in this case is substantially the same as one in the case where the routine shown in FIG. 10 is repeatedly executed in the state where the sealing valve 28 is normal. To avoid redundant descriptions, detailed descriptions of the procedure will be omitted.

When the closing failure occurs in the sealing valve 28, the sealing valve 28 cannot normally open even if the valve opening instruction is issued in Step 208. In this case, the tank internal pressure Ptnk may increases above the valve opening pressure Popen, and can increase to the forward direction valve opening pressure of the pressure control valve 30 in terms of a mechanism.

As described above, the predetermined pressure Pth5 used in Step 230 is higher than the valve opening pressure Popen and lower than the forward direction valve opening pressure of the pressure control valve 30. Thus, when the closing failure occurs in the sealing valve 28, the tank internal pressure Ptnk sometimes exceeds Pth5.

In the present embodiment, when determining in Step 230 that such a state occurs, that is, the condition of Ptnk>Pth5 is satisfied, the ECU 60 performs the procedure of Step 220 to judge the closing failure of the sealing valve 28. Thus, according to the routine shown in FIG. 11, it can be accurately determined whether the closing failure occurs in the sealing valve 28 while the tank internal pressure Ptnk is controlled to a value near the atmospheric pressure during the operation of the internal combustion engine as in the case where the above described routine shown in FIG. 10 is excused. Thus, according to the present embodiment, the closing failure of the sealing valve 28 can be efficiently detected in the system where the tank internal pressure Ptnk is not made negative by normal control.

Eighth Embodiment

Figure 12:
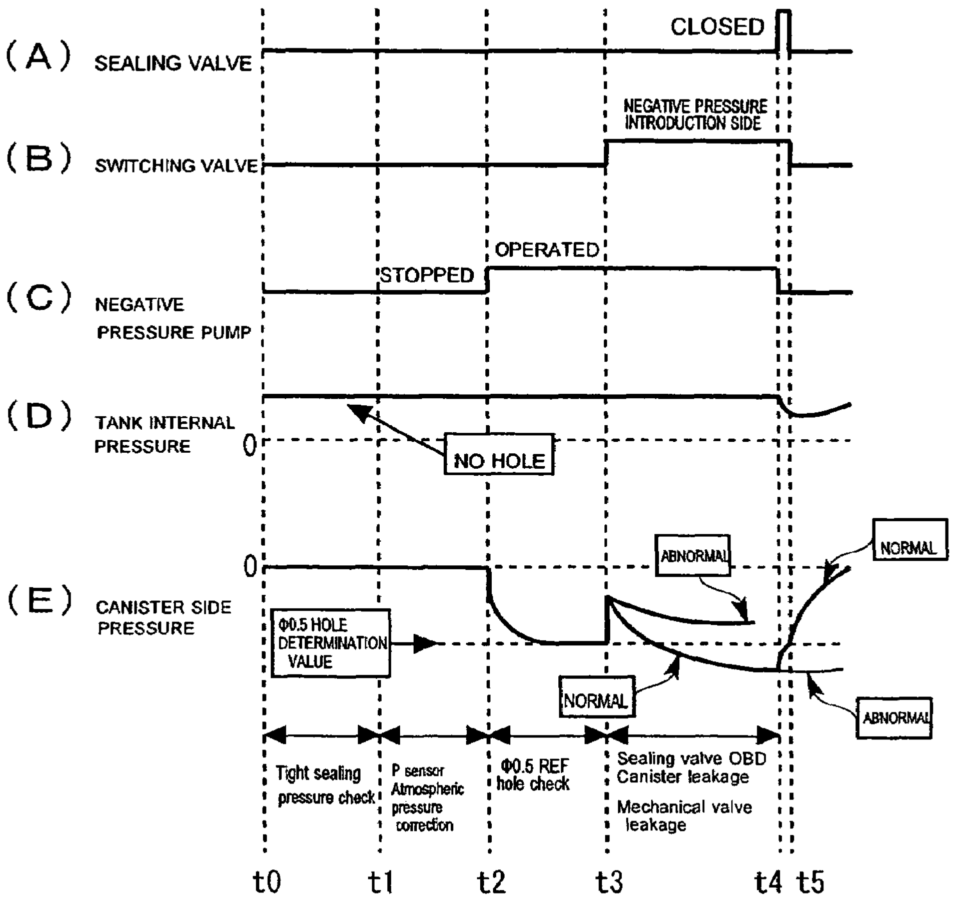
FIGS. 12A through 12E are timing charts for describing an operation of a device according to an eighth embodiment of the invention.

Next, an eighth embodiment of the invention will be described with reference to FIGS. 12 through 14.

An evaporated fuel treatment device according to the present embodiment can be achieved by modifying the device according to the second embodiment such that the ECU 60 performs the below described routine shown in FIG. 14 instead of the routine shown in FIG. 5.

Like the device according to the second embodiment, the device according to the present embodiment introduces negative pressure into the canister 26 with the sealing valve 28 being closed before issuing a valve opening instruction to the sealing valve 28. Then, it is determined whether closing failure occurs in the sealing valve 28 depending on whether a significant change occurs in tank internal pressure Ptnk in response to the instruction.

In a case where the sealing valve 28 is normal, large differential pressure is generated between canister side pressure Pcani and the tank internal pressure Ptnk before the valve opening instruction is issued. When the sealing valve 28 opens in response to the valve opening instruction, the canister side pressure Pcani and the tank internal pressure Ptnk change to reduce the differential pressure. In the device according to the first embodiment, the sealing valve 28 is kept open after the valve opening instruction is issued until the canister side pressure Pcani and the tank internal pressure Ptnk become substantially equal as shown in FIGS. 4A through 4E.

For determining whether or not the sealing valve 28 opens properly in response to the valve opening instruction, it is sufficient that a pressure change detectable by the pump module pressure sensor 86 (or the tank internal pressure sensor 12) occurs in the canister side pressure Pcani (or the tank internal pressure Ptnk) after the valve opening instruction. In other words, for the determination, there is no need for a great change that causes the canister side pressure Pcani and the tank internal pressure Ptnk to be substantially equal.

A great reduction in the canister side pressure Pcani and a great increase in the tank internal pressure Ptnk after the sealing valve 28 opening mean that a large amount of air flows into the fuel tank 10 as the valve opens. On the other hand, a great increase in the canister side pressure Pcani and a great reduction in the tank internal pressure Ptnk after the sealing valve 28 opening mean that a large amount of evaporated fuel flows out of the fuel tank 10 toward the canister 26 as the valve opens.

As described above, the large amount of air flowing into the fuel tank 10 causes excessively high tank internal pressure Ptnk after abnormality detection. The large amount of evaporated fuel flowing into the canister 26 causes blow through of the evaporated fuel into the atmosphere. Thus, it is desirable that the change in the canister side pressure Pcani and the change in the tank internal pressure Ptnk are as small as possible when determining whether or not the closing failure occurs in the sealing valve 28. Thus, when diagnosing the closing failure of the sealing valve 28, the device according to the present embodiment issues a valve closing instruction to the sealing valve 28 after a time period sufficiently shorter than the time period required for the canister side pressure Pcani and the tank internal pressure Ptnk to be equal is elapsed after issuing the valve opening instruction to the sealing valve 28.

FIGS. 12A through 12E are timing charts for illustrating the above described operations. In FIGS. 12A through 12E, operations before time t5 are the same as the operations described in the second embodiment (see FIGS. 4A through 4E). Thus, detailed descriptions thereof will be omitted.

FIG. 12A shows that the valve closing instruction is issued to the sealing valve 28 when a predetermined time period has elapsed (time t5) since time t4. FIG. 12B shows that the switching valve 80 is returned from a negative pressure introduction side to a normal side (nonenergized side) at the time 5. These procedures can minimize the change in the tank internal pressure Ptnk as the sealing valve 28 opens, as shown in FIG. 12D. Thus, the amount of gas supplied and received between the fuel tank 10 and the canister 26 can be sufficiently reduced.

Figure 13:
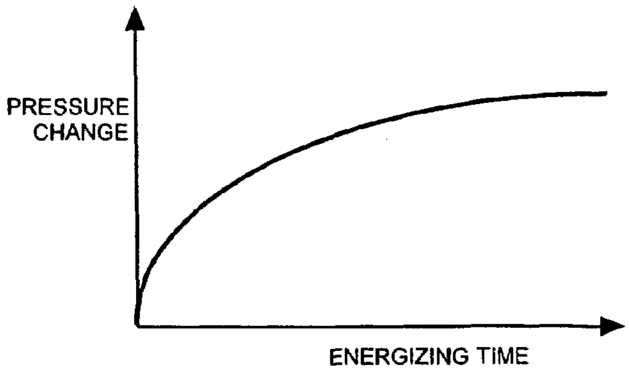
FIG. 13 is a diagram to be referred in the eighth embodiment of the invention for determining a time period between issuance of opening instruction and issuance of closing instruction to a sealing valve.

FIG. 13 is a diagram for describing a method for determining a predetermined time period required for keeping the sealing valve 28 in an opened state after the time t4. More specifically, FIG. 13 shows a relationship between an energizing time of the sealing valve 28 and a pressure change that occurs in the canister side pressure Pcani or the tank internal pressure Ptnk.

As shown in FIG. 13, a longer energizing time of the sealing valve 28 causes a greater change in the canister side pressure Pcani or the tank internal pressure Ptnk. Previously understanding such a property, and considering accuracy and sensitivity of the pump module pressure sensor 86, the present embodiment sets the energizing time such that a minimum change detectable by the pump module pressure sensor 86 will cause in the canister side pressure Pcani when the system is normal. The ECU 60 issues the valve closing instruction to the sealing valve 28 at a time when a predetermined time period thus set has elapsed since the valve opening instruction is issued to the sealing valve 28 (time t4). Thus, the device according to the present embodiment can accurately determine the closing failure of the sealing valve 28 while minimizing the amount of gas supplied and received between the fuel tank 10 and the canister 26.

Figure 14:
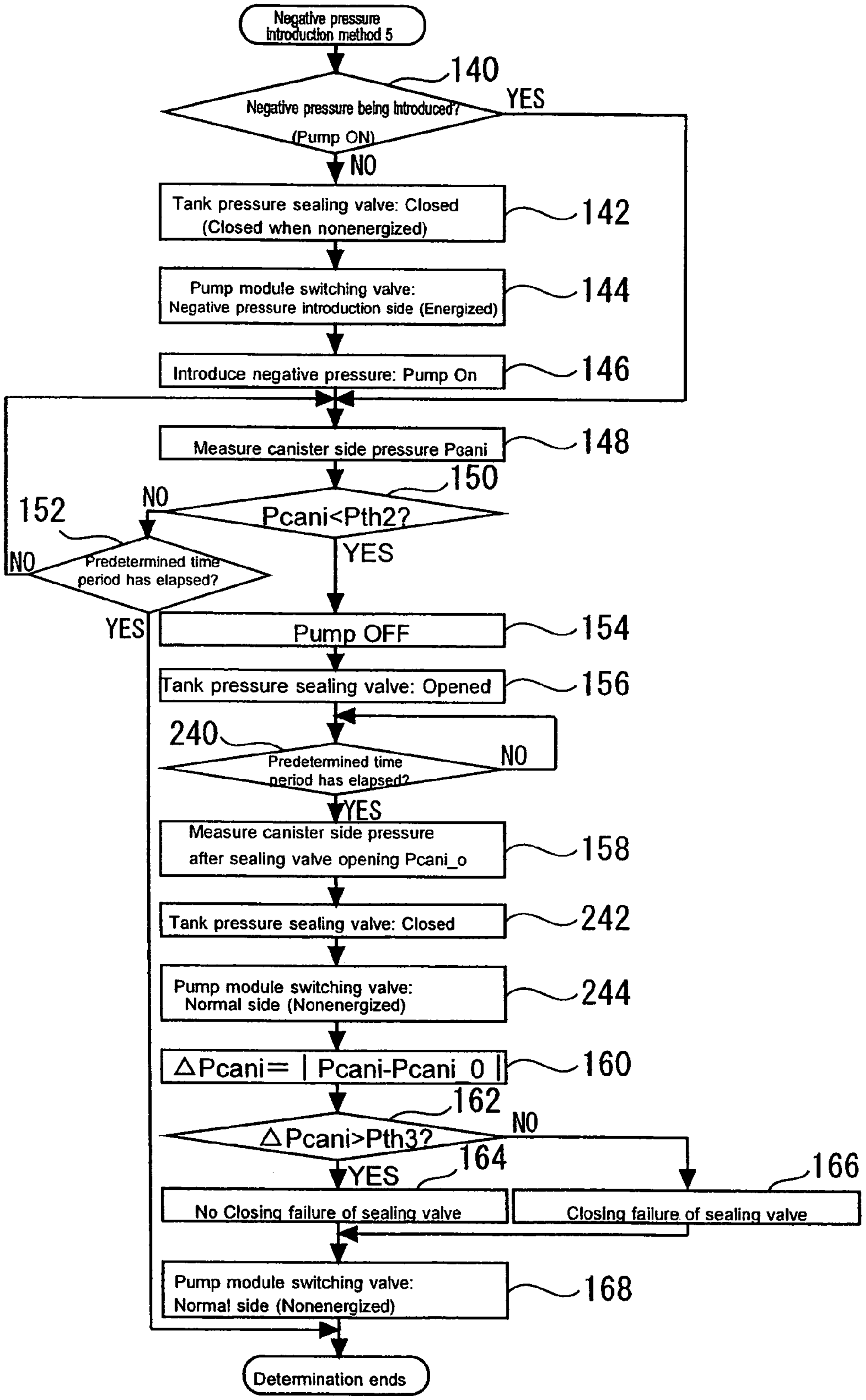
FIG. 14 is a flowchart of a control routine performed in the eighth embodiment of the invention.

FIG. 14 is a flowchart of a control routine performed by the ECU 60 in the present embodiment for achieving the above described function. The routine shown in FIG. 14 is the same as the routine shown in FIG. 5 except that Step 240 is inserted immediately after Step 156, and the procedures of Steps 242 and 244 are inserted after Step 158. In FIG. 14, like reference numerals denote like steps as in FIG. 5, and descriptions thereof will be omitted or simplified.

In the routine shown in FIG. 14, after the introduction of negative pressure into the canister 26 (Steps 140 to 154), the valve opening instruction is issued to the sealing valve 28(Step 156). Then, elapse of a predetermined time period is awaited (Step 240). The predetermined time period is a minimum time period required for the change detectable by the pump module pressure sensor 86 to occur in the canister side pressure Pcani, when the sealing valve 28 is normally changed from the closed state to the opened state. More specifically, the predetermined time period is sufficiently shorter than a required time period required for the canister side pressure Pcani and the tank internal pressure Ptnk to be equal after the sealing valve 28 is properly opened, preferably shorter than three fourth of the required time period, and more preferably shorter than half of the required time period. Further the predetermined time period is a time longer than the time period for the minimum pressure change to occur in Pcani, which minimum pressure change being accurately detectable by the pump module pressure sensor 86 in view of sensitivity or accuracy. The minimum time may be set to a control cycle of the ECU 60 (for example, 65 msec or 100 msec) in the shortest case.

When it is determined in Step 240 that the predetermined time period has elapsed, canister side pressure Pcani_o at that time is measured (Step 158) before the valve closing instruction is issued to the sealing valve 28 (Step 242). Then, the switching valve 80 is brought to the normal state (nonenergized state) (Step 244). Thereafter, the procedures after Step 160 are performed as in the routine shown in FIG. 5.

As described above, according to the routine shown in FIG. 14, the sealing valve 28 can be closed after the minimum time period for determining the closing failure of the sealing valve 28 has elapsed since the valve opening instruction is issued to the sealing valve 28. Thus, the device according to the present embodiment can accurately determine the closing failure of the sealing valve 28 like the device according to the second embodiment, and further prevents the evaporated fuel from blowing through into the atmosphere and the tank internal pressure from excessively increasing more effectively than the device according to the second embodiment.

In the eighth embodiment, the function of closing the sealing valve 28 at the time when the predetermined time period has elapsed after the valve opening instruction is incorporated into the device according to the second embodiment. However, the device into which the function is incorporated is not limited to the device according to the second embodiment. That is, the above described function may be incorporated into any of the devices according to the fist embodiment and the third embodiment through the fifth embodiment.

The major benefits of the present invention described above are summarized as follows:

According to a first aspect of the present invention, because the sealing valve is generally closed and the fuel tank is sealed during the stop of the internal combustion engine, the tank internal pressure is sometimes greatly apart from the atmospheric pressure. According to the invention, the valve opening instruction is issued to the sealing valve in such a state, and hence, depending on whether the significant change occurs in the tank internal pressure, it can be diagnosed accurately whether the closing failure occurs in the sealing valve.

According to a second aspect of the present invention, the opening of the sealing valve can be prohibited when there is a possibility that the opening causes the evaporated fuel to blow through the canister. Thus, the invention effectively prevents worse emission properties caused by diagnosing the sealing valve.

According to a third aspect of the present invention, the negative pressure is introduced into the canister in a state where the sealing valve should be closed. After the canister side pressure becomes sufficiently negative, the valve opening instruction is issued to the sealing valve. If the sealing valve is properly in a closed state before the valve opening instruction is issued, and the sealing valve properly opens in response to the valve opening instruction, the significant pressure change is to occur in both the tank internal pressure and the canister side pressure between before and after the valve opening instruction. According to the invention, when there is no sign that the sealing valve opens before the valve opening instruction, and no significant pressure change as described above occurs, the closing failure of the sealing valve can be determined.

According to a fourth aspect the present invention, the valve opening instruction is issued to the sealing valve after the canister side pressure becomes sufficiently negative. It can be determined that no closing failure occurs in the sealing valve, when the significant pressure change occurs in the tank internal pressure or the canister side pressure.

According to a fifth aspect of the present invention, the negative pressure can be introduced into the canister in the state where the sealing valve should be closed. After the canister side pressure becomes sufficiently negative, the valve opening instruction is issued to the sealing valve. When there is a sign that the sealing valve is actually in an opened state before or after the valve opening instruction, and no significant pressure change occurs in the tank internal pressure nor the canister side pressure between before and after the valve opening instruction, it can be determined that no differential pressure is generated between the tank internal pressure and the canister side pressure before the valve opening instruction. On the other hand, when there is no sign that the sealing valve is actually in an opened state, and there is no sign of significant pressure change between before and after the valve opening instruction, it can be determined that the closing failure occurs in the sealing valve. According to the invention, the closing failure of the sealing valve can be accurately determined in the latter case.

According to a sixth aspect of the present invention, it can be determined whether the sealing valve is actually in opened state depending on whether desired differential pressure is actually generated by procedures for generating the differential pressure on both sides of the sealing valve.

According to a seventh aspect of the present invention, it can be determined whether the sealing valve is actually in opened state depending on whether the change occurs in the tank internal pressure by changing the canister side pressure.

According to a eighth aspect of the present invention, the closing failure of the sealing valve can be diagnosed depending on whether the significant change occurs in the canister side pressure between before and after the valve opening instruction is issued to the sealing valve.

According to a ninth aspect of the present invention, the negative pressure can be continuously introduced into the canister before and after the valve opening instruction is issued to the sealing valve. Then, the difference between the tank internal pressure before the valve opening instruction is issued, and the tank internal pressure at a time when a certain time period has elapsed since the instruction is issued can be detected. When the closing failure occurs in the sealing valve, the difference does not become a meaningful value. On the other hand, when the sealing valve opens and closes normally, or when the opening failure occurs in the sealing valve, the difference becomes a meaningful value. According to the invention, it can be determined whether the closing failure occurs in the sealing valve depending on whether the difference is significant.

According to a tenth aspect of the present invention, the procedure of opening the sealing valve is performed so as to prevent the tank internal pressure from exceeding the predetermined valve opening pressure. The closing failure of the sealing valve can be judged when the tank internal pressure is not reduced although the valve opening instruction is issued to the sealing valve.

According to an eleventh aspect of the present invention, the procedure of opening the sealing valve is performed so as to prevent the tank internal pressure from exceeding the predetermined valve opening pressure. The closing failure of the sealing valve can be judged when the excessively high tank internal pressure occurs although the procedure is performed.

According to a twelfth aspect of the present invention, the pressure control valve provided in parallel with the sealing valve prevents the tank internal pressure from being excessively greatly apart from the atmospheric pressure. While using such a structure, the invention can determine the closing failure of the sealing valve during the process until the tank internal pressure reaches the set valve opening pressure of the pressure control valve.

According to a thirteenth aspect of the present invention, the sealing valve can be closed to tightly seal the fuel tank at the time when the small amount of gas flows out of the fuel tank (in the case where the tank internal pressure is positive), or when the small amount of air flows into the fuel tank (in the case where the tank internal pressure is negative), after the sealing valve opens. Thus, according to the invention, the amount of evaporated fuel flowing out as the sealing valve opens can be sufficiently reduced (in the case where the tank internal pressure is positive), or the excessive increase in the tank internal pressure after the sealing valve is closed can be avoided (in the case where the tank internal pressure is negative).

Further, the present invention is not limited to these embodiments, but variations and modifications may be made without departing from the scope of the present invention.

The entire disclosure of Japanese Patent Application No. 2002-321659 filed on Nov. 11, 2002 including specification, claims, drawings and summary are incorporated herein by reference in its entirety.

What is claimed:

1. An evaporated fuel treatment device of an internal combustion engine having a canister that adsorbs evaporated fuel generated in a fuel tank for treatment, comprising:

a sealing valve that is disposed between said fuel tank and said canister and controls a communication state between said fuel tank and said canister;

tank internal pressure control means that issues a valve opening instruction to said sealing valve when tank internal pressure reaches a predetermined positive valve opening pressure while said sealing valve is closed;

decompression presence/absence determination means that determines whether said tank internal pressure is reduced in response to the valve opening instruction by said tank internal pressure control means; and closing failure determination means that determines closing failure of said sealing valve when there is no sign of said reduction in the tank internal pressure under a condition in which said tank internal pressure reaches said predetermined positive valve opening pressure, thereby said valve opening instruction is issued to said sealing valve.

2. An evaporated fuel treatment device of an internal combustion engine having a canister that adsorbs evaporated fuel generated in a fuel tank for treatment, comprising:

a sealing valve that controls a communication state between the fuel tank and the canister;

a tank internal pressure control unit is provided for issuing a valve opening instruction to the sealing valve when tank internal pressure reaches predetermined valve opening pressure;

a decompression presence/absence determination unit that determined whether the tank internal pressure is reduced in response to the valve opening instruction by the tank internal pressure control means; and a closing failure determination unit that determines closing failure of the sealing valve when there is no sign of the reduction in the tank internal pressure.

3. The device of claim 2, comprising:

a closing failure determination unit that determines closing failure of the sealing valve when tank internal pressure exceeds a predetermined determination value which is higher than the valve opening pressure in a state where the tank internal pressure control means is allowed to operate.

* * * * *